US012425151B2

United States Patent
Manolakos et al.

(10) Patent No.: US 12,425,151 B2
(45) Date of Patent: Sep. 23, 2025

(54) DEMODULATION REFERENCE SIGNAL SHARING PATTERN SELECTION IN A WIRELESS COMMUNICATION SYSTEM

(71) Applicant: QUALCOMM Incorporated, San Diego, CA (US)

(72) Inventors: Alexandros Manolakos, Escondido, CA (US); Gokul Sridharan, Sunnyvale, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/210,133

(22) Filed: Mar. 23, 2021

(65) Prior Publication Data

US 2021/0306122 A1 Sep. 30, 2021

Related U.S. Application Data

(60) Provisional application No. 62/994,531, filed on Mar. 25, 2020.

(51) Int. Cl.
*H04L 5/00* (2006.01)
*H04L 1/22* (2006.01)

(52) U.S. Cl.
CPC .............. *H04L 5/0048* (2013.01); *H04L 1/22* (2013.01)

(58) Field of Classification Search
CPC . H04L 5/0048; H04L 1/22; H04L 1/08; H04L 5/0094; H04L 5/0051
See application file for complete search history.

(56) References Cited

U.S. PATENT DOCUMENTS

| | | | | |
|---|---|---|---|---|
| 2020/0136874 A1* | 4/2020 | Baldemair | ............ | H04L 5/0058 |
| 2020/0244329 A1* | 7/2020 | Xiao | ............... | H04B 7/0413 |
| 2020/0366426 A1* | 11/2020 | Han | ............... | H04L 5/0055 |
| 2021/0111845 A1* | 4/2021 | Bae | ............... | H04L 5/0048 |
| 2021/0212032 A1* | 7/2021 | Lee | ............... | H04W 72/23 |
| 2021/0399857 A1* | 12/2021 | Baldemair | ............ | H04W 16/14 |

FOREIGN PATENT DOCUMENTS

| | | |
|---|---|---|
| CN | 106063211 A | 10/2016 |
| CN | 109274471 A | 1/2019 |
| EP | 3609104 A1 | 2/2020 |
| WO | WO-2021178788 A1 * | 9/2021 ........... H04L 5/0051 |

OTHER PUBLICATIONS

International Search Report and Written Opinion—PCT/US2021/023915—ISA/EPO—Jun. 9, 2021 (203089WO).
Nokia, et al., "NR-U Uplink Signals and Channels", 3GPP TSG RAN WG1 Meeting #97, R1- 906643, Reno, USA, May 13-18, 2019, May 4, 2019, 15 pages.

* cited by examiner

*Primary Examiner* — Justin T Van Roie
(74) *Attorney, Agent, or Firm* — Arun Swain

(57) ABSTRACT

Wireless communication techniques leveraging DMRS sharing patterns are disclosed. A method of wireless communication includes receiving, by a user equipment (UE) device, control information. The control information indicates mapping of uplink transmission parameters to one or more demodulation reference signal (DMRS) sharing patterns. The method further includes sending an uplink transmission to a base station in accordance with a DMRS sharing pattern. The DMRS sharing pattern is selected from among the one or more DMRS sharing patterns based on one or more parameters of the uplink transmission. Other aspects and features are also claimed and described.

30 Claims, 9 Drawing Sheets

DEMODULATION REFERENCE SIGNAL SHARING PATTERN SELECTION IN A WIRELESS COMMUNICATION SYSTEM

CROSS-REFERENCE TO RELATED APPLICATION

This application claims the benefit of priority to U.S. Pat. App. No. 62/994,531, entitled "demodulation reference signal sharing pattern selection in a wireless COMMUNICATION system" and filed on Mar. 25, 2020, which is incorporated by reference herein in its entirety.

TECHNICAL FIELD

Aspects of the present disclosure relate generally to wireless communication systems, and more particularly, to demodulation reference signal sharing pattern selection in wireless communication systems.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, by a user equipment (UE) device, one or more configuration messages including control information. The control information indicates mapping of uplink transmission parameters to demodulation reference signal (DMRS) sharing patterns. The method further includes, based on one or more parameters of an uplink transmission, determining a DMRS sharing pattern of the uplink transmission from among the DMRS sharing patterns indicated by the control information. The method further includes sending the uplink transmission to a base station in accordance with the DMRS sharing pattern.

In another aspect of the disclosure, a method of wireless communication includes sending, by a base station to a UE device, one or more configuration messages including control information. The control information indicates mapping of uplink transmission parameters to DMRS sharing patterns. The method further includes, based on one or more parameters of an uplink transmission, determining a DMRS sharing pattern of the uplink transmission from among the DMRS sharing patterns indicated by the control information. The method further includes receiving the uplink transmission from the UE device in accordance with the DMRS sharing pattern.

In another aspect of the disclosure, an apparatus configured for wireless communication includes a memory and one or more processors coupled to the memory. The one or more processors are configured to receive, at a UE device, one or more configuration messages including control information. The control information indicates mapping of uplink transmission parameters to DMRS sharing patterns. The one or more processors are further configured to determine, based on one or more parameters of an uplink transmission, a DMRS sharing pattern of the uplink transmission from among the DMRS sharing patterns indicated by the control information. The one or more processors are further configured to initiate sending the uplink transmission to a base station in accordance with the DMRS sharing pattern.

In another aspect of the disclosure an apparatus configured for wireless communication includes a memory and one or more processors coupled to the memory. The one or more processors are configured to initiate sending, from a base station to a UE device, one or more configuration messages including control information. The control information indicates mapping of uplink transmission parameters to DMRS sharing patterns. The one or more processors are further configured to determine, based on one or more parameters of an uplink transmission, a DMRS sharing pattern of the uplink transmission from among the DMRS sharing patterns indicated by the control information. The one or more processors are further configured to receive the uplink transmission from the UE device in accordance with the DMRS sharing pattern.

In an additional aspect of the disclosure, a non-transitory computer-readable medium stores instructions executable by a processor to perform operations. The operations include receiving, by a UE device, one or more configuration messages including control information. The control information indicates mapping of uplink transmission parameters to DMRS sharing patterns. The operations further include, based on one or more parameters of an uplink transmission, determining a DMRS sharing pattern of the uplink transmission from among the DMRS sharing patterns indicated by the control information. The operations further include sending the uplink transmission to a base station in accordance with the DMRS sharing pattern.

In an additional aspect of the disclosure, a non-transitory computer-readable medium stores instructions executable by a processor to perform operations. The operations include sending, by a base station to a UE device, one or more configuration messages including control information. The control information indicates mapping of uplink transmission parameters to DMRS sharing patterns. The operations further include, based on one or more parameters of an uplink transmission, determining a DMRS sharing pattern of the uplink transmission from among the DMRS sharing patterns indicated by the control information. The operations further include receiving the uplink transmission from the UE device in accordance with the DMRS sharing pattern.

In an additional aspect of the disclosure, an apparatus for wireless communication includes means for storing instructions. The apparatus further includes means for executing the instructions to receive, at a UE device, one or more configuration messages including control information. The control information indicates mapping of uplink transmission parameters to DMRS sharing patterns. The means for executing the instructions is configured to determine, based on one or more parameters of an uplink transmission, a DMRS sharing pattern of the uplink transmission from among the DMRS sharing patterns indicated by the control information. The means for executing the instructions is configured to initiate sending the uplink transmission to a base station in accordance with the DMRS sharing pattern.

In an additional aspect of the disclosure, an apparatus for wireless communication includes means for storing instructions. The apparatus further includes means for executing the instructions to initiate sending, from a base station to a UE device, one or more configuration messages including control information. The control information indicates mapping of uplink transmission parameters to DMRS sharing patterns. The means for executing the instructions is configured to determine, based on one or more parameters of an uplink transmission, a DMRS sharing pattern of the uplink transmission from among the DMRS sharing patterns indicated by the control information. The means for executing the instructions is configured to receive the uplink transmission from the UE device in accordance with the DMRS sharing pattern.

In another aspect of the disclosure, a method of wireless communication includes receiving, by a UE device, control information. The control information indicates mapping of uplink transmission parameters to one or more DMRS sharing patterns. The method further includes sending an uplink transmission to a base station based on a DMRS sharing pattern. The DMRS sharing pattern is selected from among the one or more DMRS sharing patterns based on one or more parameters of the uplink transmission.

In another aspect of the disclosure, a method of wireless communication includes sending, by a base station to a UE device, control information. The control information indicates mapping of uplink transmission parameters to one or more DMRS sharing patterns. The method further includes receiving an uplink transmission from the UE device in accordance with a DMRS sharing pattern. The DMRS sharing pattern is selected from among the one or more DMRS sharing patterns based on one or more parameters of the uplink transmission.

In another aspect of the disclosure, an apparatus for wireless communication includes a memory and one or more processors coupled to the memory. The one or more processors are configured to receive, at a UE device, control information. The control information indicates mapping of uplink transmission parameters to one or more DMRS sharing patterns. The one or more processors are further configured to initiate sending an uplink transmission to a base station based on a DMRS sharing pattern. The DMRS sharing pattern is selected from among the one or more DMRS sharing patterns based on one or more parameters of the uplink transmission.

In another aspect of the disclosure an apparatus for wireless communication includes a memory and one or more processors coupled to the memory. The one or more processors are configured to initiate sending, from a base station to a UE device, control information. The control information indicates mapping of uplink transmission parameters to one or more DMRS sharing patterns. The one or more processors are further configured to receive an uplink transmission from the UE device in accordance with a DMRS sharing pattern. The DMRS sharing pattern is selected from among the one or more DMRS sharing patterns based on one or more parameters of the uplink transmission.

In an additional aspect of the disclosure, a non-transitory computer-readable medium stores instructions executable by a processor to perform operations. The operations include receiving, by a UE device, control information. The control information indicates mapping of uplink transmission parameters to one or more DMRS sharing patterns. The operations further include sending an uplink transmission to a base station based on a DMRS sharing pattern. The DMRS sharing pattern is selected from among the one or more DMRS sharing patterns based on one or more parameters of the uplink transmission.

In an additional aspect of the disclosure, a non-transitory computer-readable medium stores instructions executable by a processor to perform operations. The operations include sending, by a base station to a UE device, control information. The control information indicates mapping of uplink transmission parameters to one or more DMRS sharing patterns. The operations further include receiving an uplink transmission from the UE device in accordance with a DMRS sharing pattern. The DMRS sharing pattern is selected from among the one or more DMRS sharing patterns based on one or more parameters of the uplink transmission.

In an additional aspect of the disclosure, an apparatus for wireless communication includes means for storing instructions. The apparatus further includes means for executing the instructions to receive, at a UE device, control information. The control information indicates mapping of uplink transmission parameters to one or more DMRS sharing patterns. The means for executing the instructions is configured to send an uplink transmission to a base station based on a DMRS sharing pattern. The DMRS sharing pattern is selected from among the one or more DMRS sharing patterns based on one or more parameters of the uplink transmission.

In an additional aspect of the disclosure, an apparatus for wireless communication includes means for storing instructions. The apparatus further includes means for executing the instructions to initiate sending, from a base station to a UE device, control information. The control information indicates mapping of uplink transmission parameters to one or more DMRS sharing patterns. The means for executing the instructions is configured to receive an uplink transmission from the UE device in accordance with a DMRS sharing pattern. The DMRS sharing pattern is selected from among the one or more DMRS sharing patterns based on one or more parameters of the uplink transmission.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
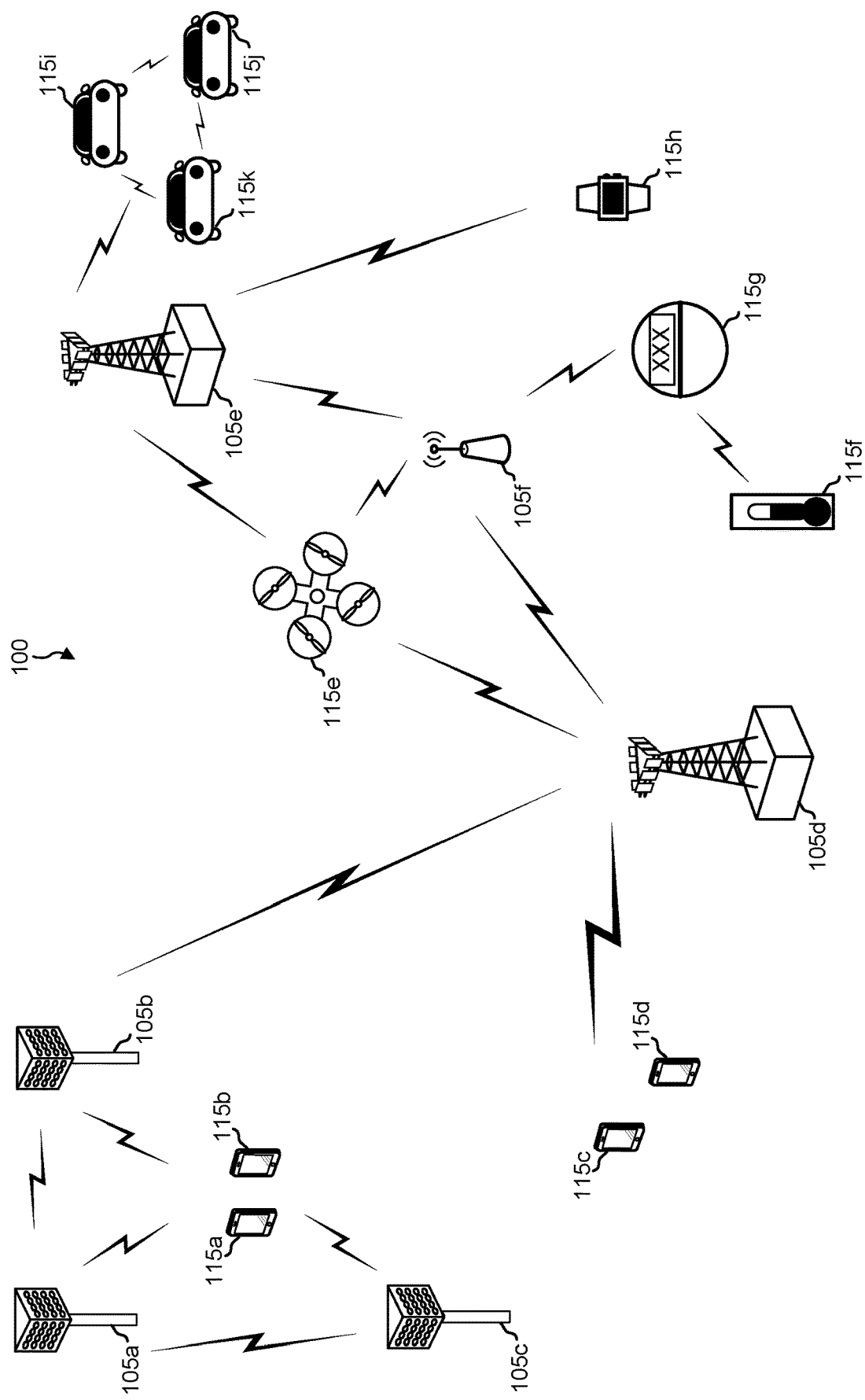
FIG. 1 is a block diagram illustrating an example of a wireless communication system configured to perform demodulation reference signal (DMRS) sharing pattern selection according to some aspects of the present disclosure.

In some aspects of the disclosure, one or more devices of a wireless communication system are configured to determine a demodulation reference signal (DMRS) sharing pattern. Some deployments can be for an uplink transmission based one or more parameters of the uplink transmission. The uplink transmission may include repetitions having a DMRS. The uplink transmission may also include repetitions that do not include a DMRS (e.g., repetitions that "share" a DMRS with one or more other repetitions). The DMRS sharing pattern can indicate an order of repetitions including a DMRS and repetitions not including a DMRS. Additional or alternative aspects include various designs of different DMRS patterns to support DMRS sharing (e.g., when PUSCH repetition is enabled).

One or more aspects of the disclosure may improve efficiency or performance of a wireless communication system. For example, by determining a DMRS sharing pattern for an uplink transmission based on one or more parameters of the uplink transmission, the DMRS sharing pattern can be "customized" or "tailored" to one or more particular uplink transmissions. As a result, uplink transmissions of different parameters can be associated with different DMRS sharing patterns, which may increase efficiency or performance in some cases as compared to certain other techniques (e.g., common DMRS sharing pattern for uplink transmission of different parameters).

The detailed description, in connection with the drawings, is intended as a description of various aspects and is not intended to limit the scope of the disclosure. Rather, the detailed description includes specific details for the purpose of providing an understanding of the subject matter of the disclosure. It will be apparent to those skilled in the art that certain details are not required in every case and that, in some instances, well-known structures and components are shown in block diagram form for clarity of presentation.

Aspects of the disclosure may be used for wireless communication networks, such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

5G NR devices, networks, and systems may use OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QOS) parameters. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated circuits and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also include additional components and features. It is intended that innovations described herein may be practiced in a wide variety of implementations, including both large/small devices, chip-level components, multi-component systems (e.g., an RF-chain, communication interface, or processor), distributed arrangements, end-user devices, etc. of varying sizes, shapes, and configurations.

FIG. 1 shows wireless network 100 for communication according to some aspects. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus include a mobile phone, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 may support communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
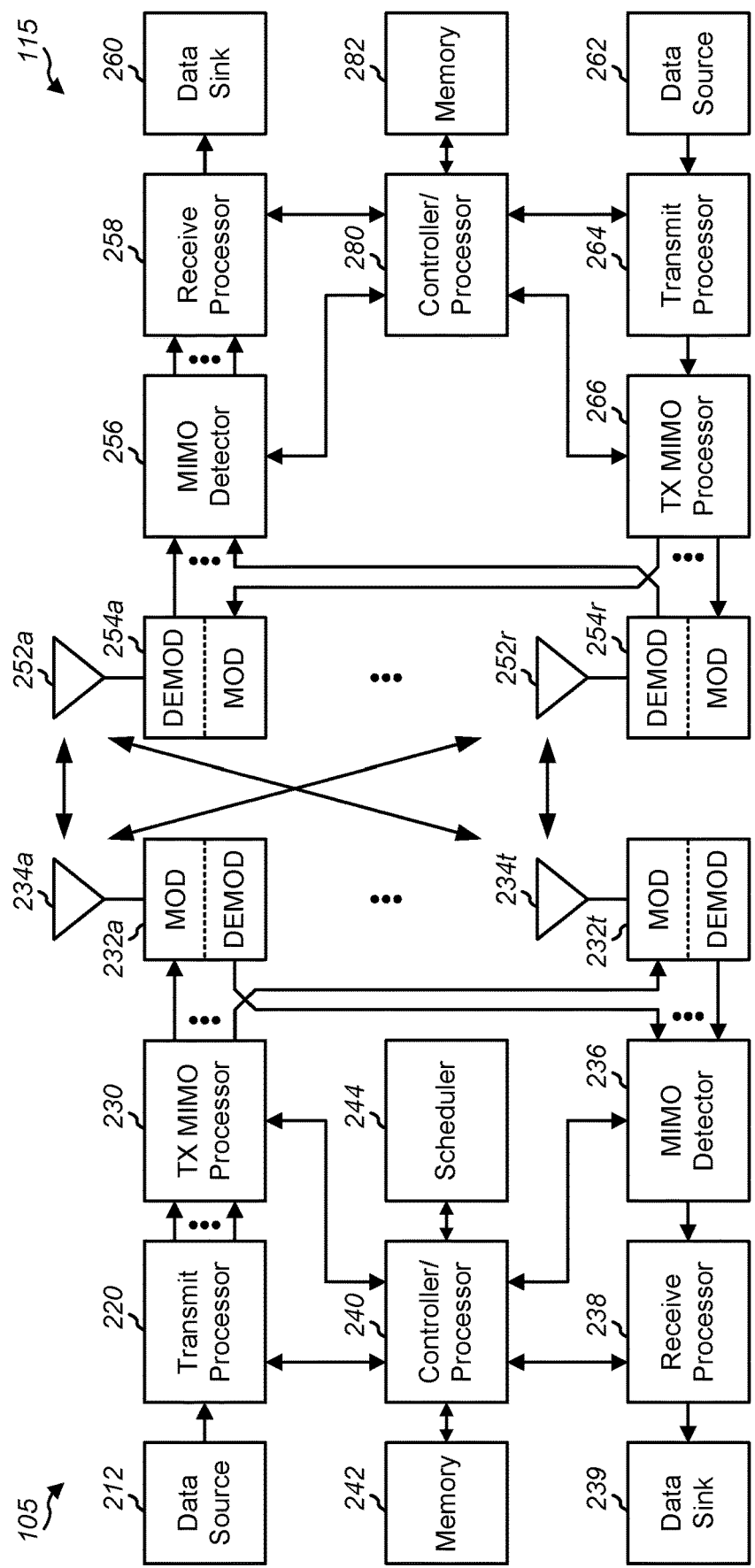
FIG. 2 is a block diagram illustrating an example of a base station and a UE configured to perform DMRS sharing pattern selection according to some aspects of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115D operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232*a* through 232*t*. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, the antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 7 and 8, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
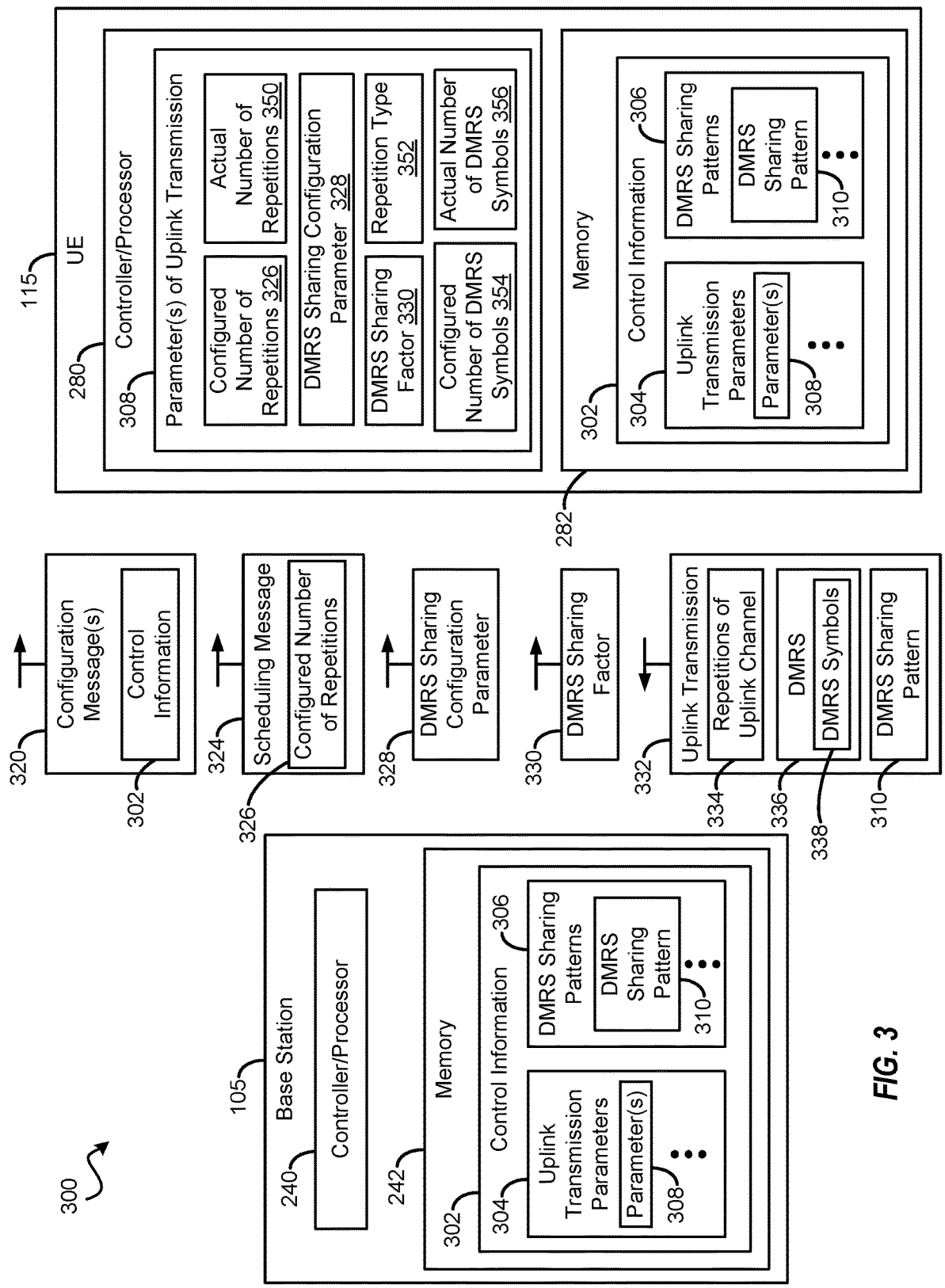
FIG. 3 is a block diagram of an example of a wireless communication system configured to perform DMRS sharing pattern selection according to some aspects of the present disclosure.

Referring to FIG. 3, an illustrative example of a wireless communication system is depicted and generally designated 300. The wireless communication system 300 includes the base station 105 and the UE 115. Although the example of FIG. 3 illustrates a single base station 105 and a single UE 115, in other examples, the wireless communication system 300 may include multiple base stations 105, multiple UEs 115, one or more other devices, or a combination thereof.

During operation, the UE 115 may receive control information 302. For example, the base station 105 may send the control information 302 to the UE 115 via one or more configuration messages 320. The UE 115 may store the control information 302, such as at the memory 282.

The base station 105 may schedule an uplink transmission 332 of the UE 115. For example, the base station 105 may send a scheduling message 324 to the UE 115 to schedule the uplink transmission 332. The uplink transmission 332 includes multiple repetitions 334 of the same uplink channel, such as a physical uplink shared channel (PUSCH). In an example, the uplink transmission 332 corresponds to a single PUSCH transmission with the repetitions 334 spanning across multiple symbols in one or more slots.

For example, in some wireless communication data protocols, data may be initially transmitted and then retransmitted one or more times to increase reliability of the data. As used herein, a "repetition" may refer to both the initial transmission of data and retransmission of the data. To illustrate, data that is initially transmitted and then retransmitted once may correspond to two repetitions. As another example, data that is initially transmitted and then retransmitted three times may correspond to four repetitions.

The uplink transmission 332 further includes a DMRS 336. The base station 105 may be configured to demodulate one or more of the repetitions 334 of the uplink transmission 332 based on the DMRS 336. In some examples, the DMRS 336 is associated with a DMRS sharing pattern 310. In this case, the DMRS 336 may be "shared" among multiple repetitions 334 based on the DMRS sharing pattern 310 (e.g., where a repetition 334 that does not include a DMRS 336 is demodulated by the base station 105 using a repetition 334 that includes a DMRS 336). Generally, a sharing pattern relates to how one or more DMRS may be shared among various transmissions (e.g., for demodulation of data resource elements of transmissions which may or may not include a DMRS, and which use the DMRS of another transmission). According to the DMRS sharing pattern, one or more DMRS may be transmitted within the physical resources of one or more first uplink transmissions or repetitions of an uplink channel, which are used for demodulation of the data of other uplink transmissions or repetitions of the uplink channel. In some specific instances, a "DMRS sharing pattern" (such as the DMRS sharing pattern 310) can indicate an ordering of one or more uplink repetitions of an uplink channel that include a DMRS, whereas a set of one or more other repetitions of the uplink channel may not have a DMRS. In the one or more repetitions that do not include a DMRS, demodulation may use the DMRS of the one or more repetitions that contain a DMRS. Additionally or alternatively, a DMRS sharing pattern can indicate one or more other uplink repetitions of the uplink channel that do not include the DMRS and that are to be demodulated based on the DMRS of other uplink transmissions which can be earlier in time or later in time than the uplink channels that do not include DMRS. Sharing patterns may be static or dynamic. In some instances, sharing patterns can evolve during communications operations. Sharing patterns may be pre-provisioned or determined during operations based on desired system operations. Sharing patterns may be stored in memory of a communication device.

In some aspects of the disclosure, one or both of the base station 105 and the UE 115 are configured to determine the DMRS sharing pattern 310 based on one or more parameters 308 of the uplink transmission 332. To illustrate, the control information 302 may indicate mapping of uplink transmission parameters 304 to DMRS sharing patterns 306. In the example of FIG. 3, the uplink transmission parameters 304 include the one or more parameters 308, and the DMRS sharing patterns 306 include the DMRS sharing pattern 310.

In some implementations, the base station 105 may provide an indication of the DMRS sharing pattern 310 to the UE 115. For example, the base station 105 may be configured to send to the UE 115 a DMRS sharing configuration parameter 328 that indicates the DMRS sharing pattern 310. The DMRS sharing configuration parameter 328 may be indicated by the base station via radio resource control (RRC) configuration signaling, downlink control information (DCI) signaling, or medium access control (MAC) control element (MAC-CE) signaling, as illustrative examples. In some other examples, the UE 115 is configured to dynamically determine the DMRS sharing configuration parameter 328.

To further illustrate, in some examples, the base station 105 and the UE 115 are configured to determine the DMRS sharing pattern 310 by identifying the one or more parameters 308 of the uplink transmission and by using the one or more parameters 308 as a lookup to the control information 302 to identify the DMRS sharing pattern 310. In this example, the UE 115 is configured to send the uplink transmission 332 to the base station 105 in accordance with the DMRS sharing pattern 310, and the base station 105 is configured to receive (e.g., demodulate) the uplink transmission 332 in accordance with the DMRS sharing pattern 310. Accordingly, the control information 302 may enable the base station 105 and the UE 115 to "agree" on the particular DMRS sharing pattern 310 to be used to send and receive the uplink transmission 332 (e.g., without explicit indication of the DMRS sharing pattern 310 via the DMRS sharing configuration parameter 328). In another example, the DMRS sharing configuration parameter 328 may be used as a lookup to the control information 302 to determine the DMRS sharing pattern 310.

In one example, the one or more parameters 308 include a configured number 326 of the repetitions 334. In some implementations, the scheduling message 324 indicates the configured number 326. The configured number 326 may indicate a "maximum" or "nominal" number of repetitions of the uplink transmission 332 that can be reduced in some circumstances.

Alternatively or in addition, the one or more parameters 308 may include a DMRS sharing factor 330. As used herein, a DMRS sharing factor (such as the DMRS sharing factor 330) may refer to a ratio of a total number of uplink repetitions of an uplink channel to a number of uplink repetitions of the uplink channel that do not include a DMRS. Thus, the DMRS sharing factor 330 may indicate a number of repetitions that share a DMRS. In some examples, the base station 105 is configured to send an indication of the DMRS sharing factor 330 to the UE 115, and the UE 115 is configured to receive the indication of the DMRS sharing factor 330 from the base station 105.

Figure 4:
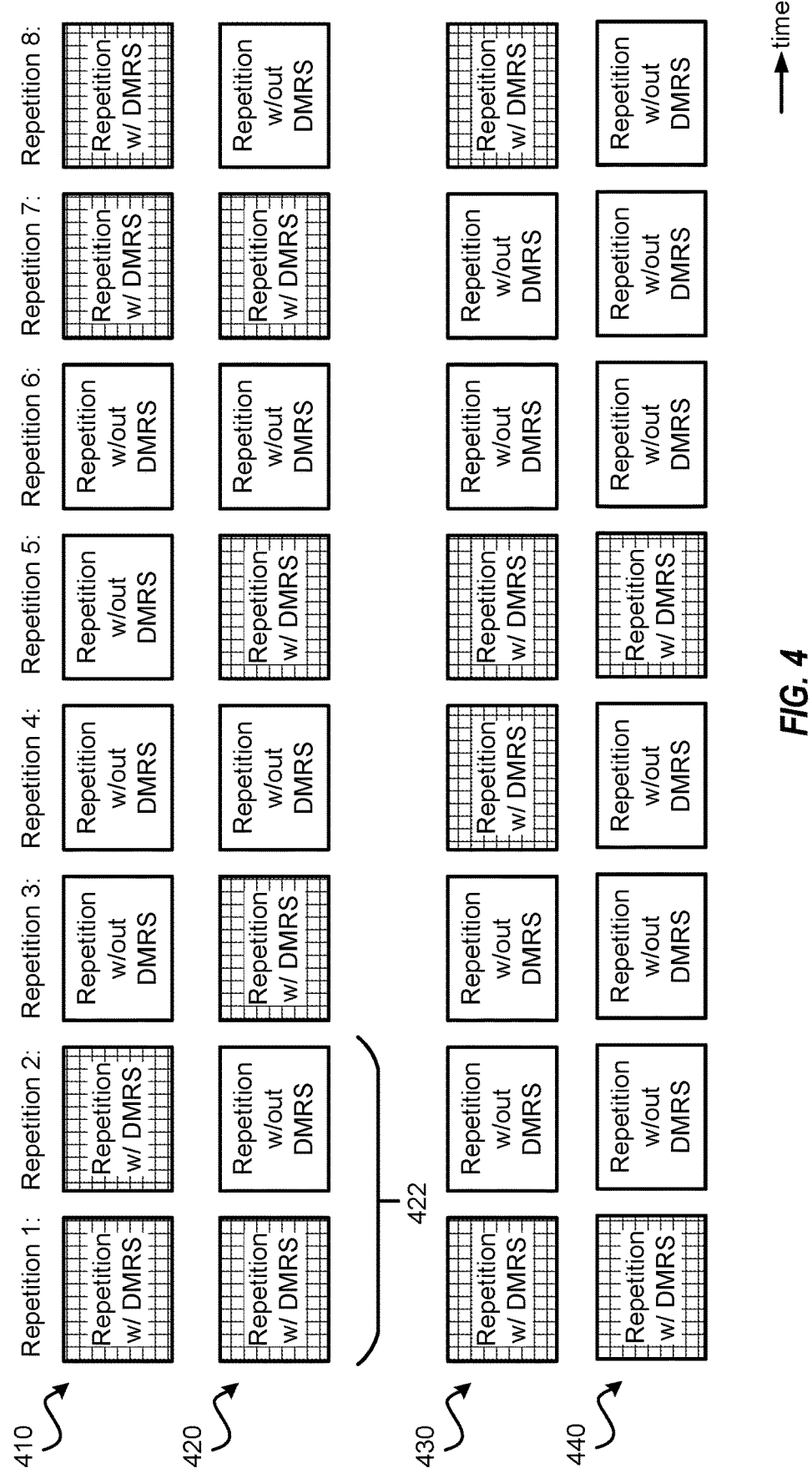
FIG. 4 is a block diagram illustrating examples of DMRS sharing patterns of an uplink transmission according to some aspects of the present disclosure.

To illustrate, FIG. 4 depicts different examples 410, 420, 430, and 440 of the uplink transmission 332. In FIG. 4, each example 410, 420, 430, and 440 of the uplink transmission 332 includes eight repetitions 334 (illustrated in FIG. 4 as repetitions 1, 2, 3, 4, 5, 6, 7, and 8). Further, in FIG. 4, time may advance to the right (e.g., where repetition 1 is transmitted prior to repetition 2, and where repetition 2 is transmitted prior to repetition 3, etc.).

Example 410 depicts a DMRS sharing pattern 310 of two repetitions having a DMRS 336, four repetitions without a DMRS, and two additional repetitions having a DMRS. In some implementations in accordance with example 410, the base station 105 may be configured to demodulate repetition 1 using the DMRS of repetition 1, to demodulate repetition 2 using the DMRS of repetition 2, and to demodulate repetitions 3-6 using one or both of the DMRS of repetitions 1 and 2.

Example 420 depicts a DMRS sharing pattern 310 that alternates repetitions with a DMRS and repetitions without a DMRS. In some implementations in accordance with example 420, the base station 105 may be configured to demodulate repetition 1 using the DMRS of repetition 1, to demodulate repetition 2 using the DMRS of repetition 1, to demodulate repetition 3 using the DMRS of repetition 3, and to demodulate repetition 2 using the DMRS of repetition 3, etc.

Further, in some examples, a DMRS sharing pattern can be repeated from a first set of the repetitions 334 to a second set of the repetitions 334. Repeating a DMRS sharing pattern may reduce an amount of information (e.g., bits) of the control information 302. To illustrate, in example 420, a pattern 422 of two repetitions may be repeated four times across the repetitions 334. In this example, the DMRS sharing pattern 310 may be based on a number of repetitions (e.g., two) that is less than the configured number 326 (e.g., eight), and the DMRS sharing pattern 310 may be repeated across the configured number 326 of repetitions 334 of the uplink transmission 332.

Example 430 illustrates additional aspects of the DMRS sharing pattern 310. In example 430, repetition 1 includes a DMRS that may be used to demodulate repetitions 1-3.

FIG. 4 illustrates that a particular number of repetitions of the uplink transmission 332 may be associated with different values of the DMRS sharing factor 330. To illustrate, in each of the examples 410, 420, and 430, the DMRS sharing factor 330 corresponds to four, and in the example 440, the DMRS sharing factor 330 corresponds to two.

FIG. 4 also illustrates that a particular DMRS sharing factor 330 and a particular configured number 326 of repetitions may be associated with multiple different DMRS sharing patterns. To illustrate, examples 410, 420, and 430 correspond to different DMRS sharing patterns for a particular DMRS sharing factor 330 (two) and a particular configured number 326 of repetitions (eight). In some examples, one or both of the base station 105 or the UE 115 are configured to select the DMRS sharing pattern 310 from among multiple DMRS sharing patterns, such as the multiple DMRS sharing patterns of examples 410, 420, and 430. The UE 115 may be configured to dynamically select the DMRS sharing pattern 310 from among multiple DMRS sharing patterns, such as the multiple DMRS sharing patterns of examples 410, 420, and 430.

Figure 5:
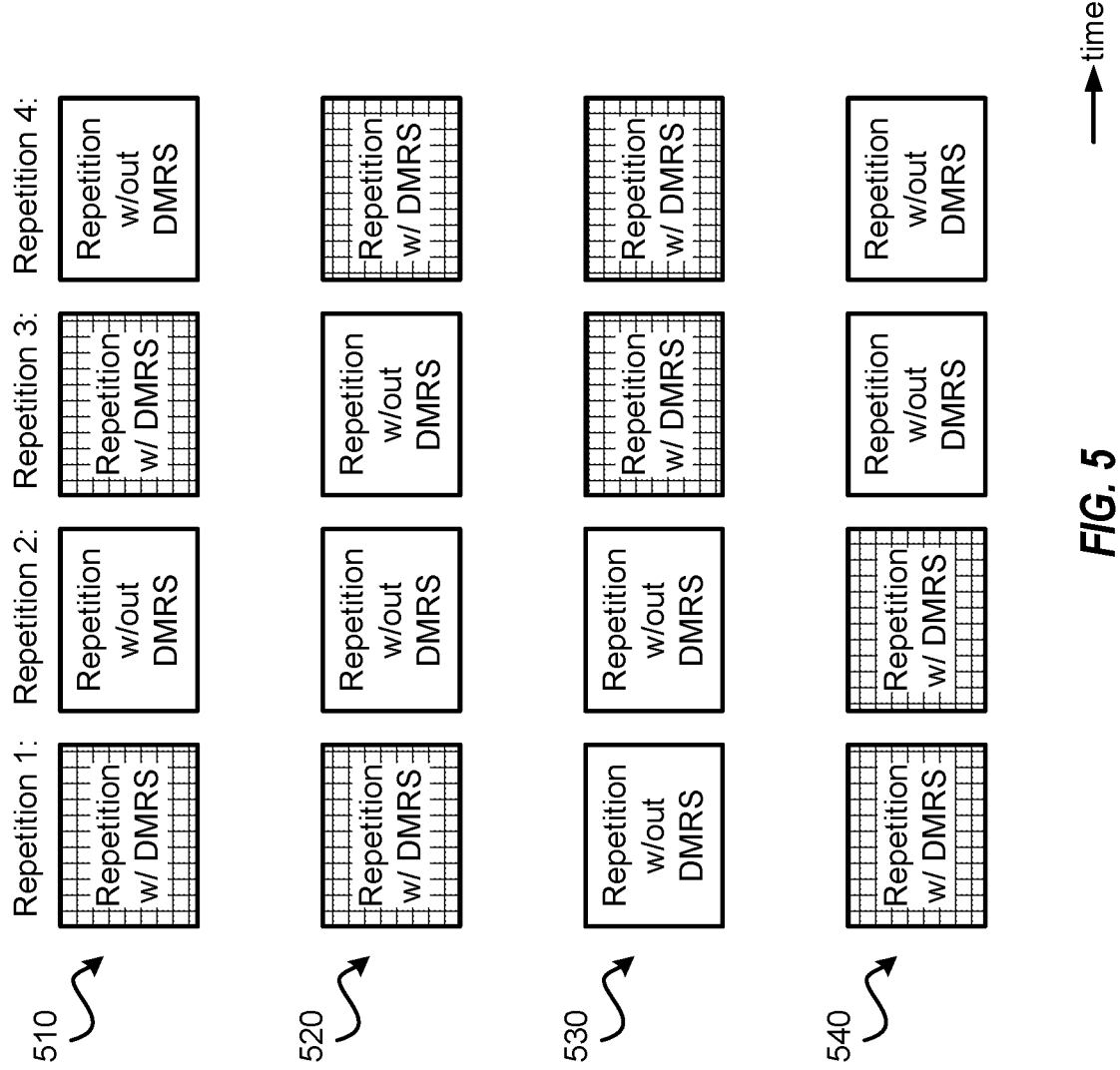
FIG. 5 is a block diagram illustrating additional examples of DMRS sharing patterns of an uplink transmission according to some aspects of the present disclosure.

FIG. 5 illustrates additional examples 510, 520, 530, and 540 of the uplink transmission 332. In FIG. 5, each example 510, 520, 530, and 540 of the uplink transmission 332 includes four repetitions 334 (illustrated in FIG. 4 as repetitions 1, 2, 3, and 4). Further, in FIG. 5, time may advance to the right (e.g., where repetition 1 is transmitted prior to repetition 2, and where repetition 2 is transmitted prior to repetition 3, etc.). Examples 510, 520, 530, 540 illustrate different DMRS sharing patterns 310 for a particular DMRS sharing factor 330 (two) and for a particular configured number 326 (four).

Referring again to FIG. 3, the one or more parameters 308 may include an actual number 350 of the repetitions 334 that is less than the configured number 326. To illustrate, in some cases, a puncturing event may occur (e.g., after scheduling of the uplink transmission 332 via the scheduling message 324). The puncturing event may be associated with modification of the uplink transmission 332 from the configured number 326 of repetitions to the actual number 350 of repetitions. As a non-limiting illustrative example, if the configured number 326 of the repetitions 334 is eight and the puncturing event cancels two of the repetitions 334, then the actual number 350 of the repetitions 334 corresponds to six. As another non-limiting illustrative example, if the configured number 326 of the repetitions 334 is eight and the puncturing event cancels one of the repetitions 334, then the actual number 350 of the repetitions 334 corresponds to seven.

Figure 6:
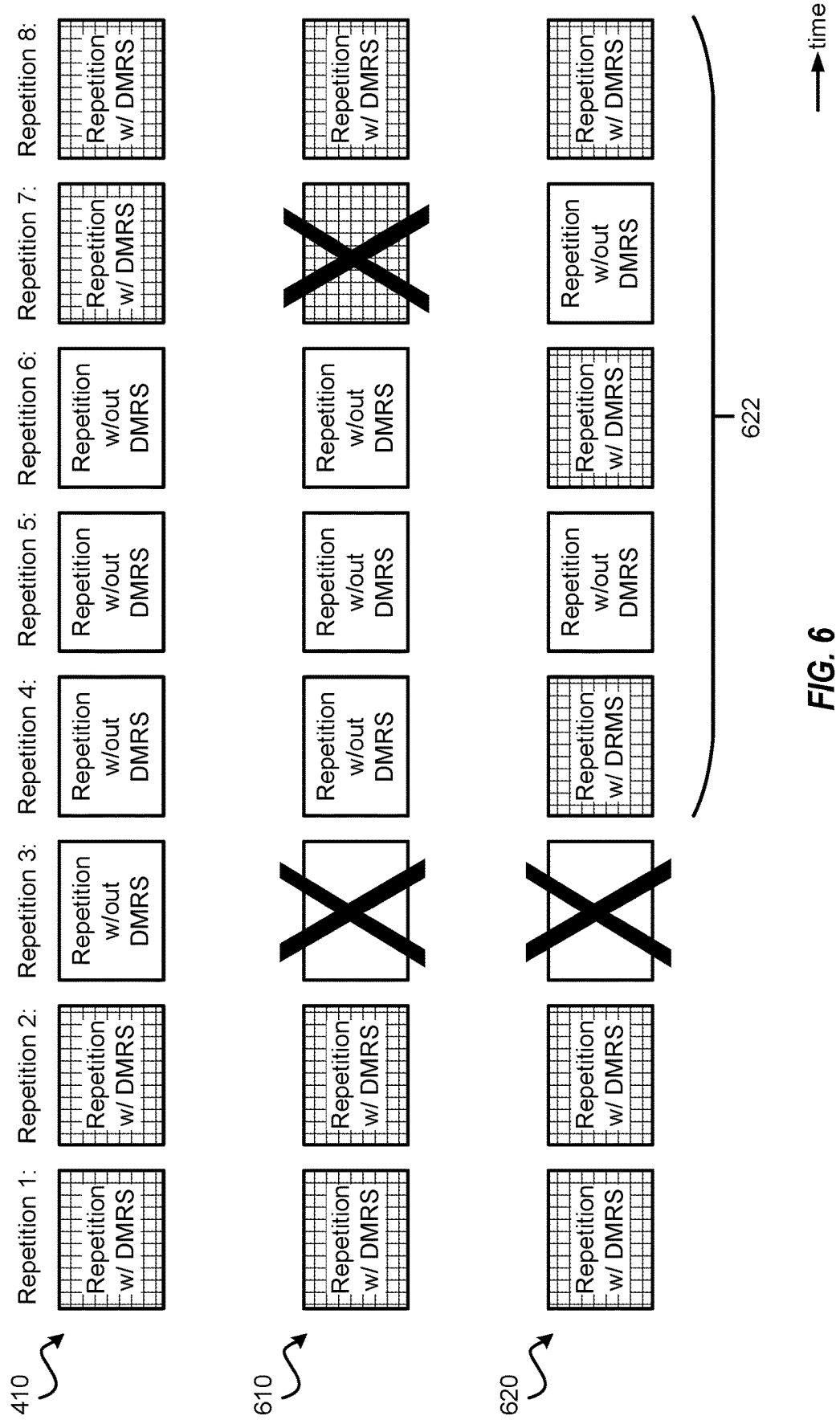
FIG. 6 is a block diagram illustrating aspects of an example of a puncturing event according to some aspects of the present disclosure.

To further illustrate FIG. 6 illustrates a puncturing event associated with the example 410 of the uplink transmission 332. The puncturing event is associated with modification of the uplink transmission 332 from the configured number 326 of repetitions 334 to an actual number 350 of repetitions 334 that is less than the configured number 326. To illustrate, the configured number 326 may correspond to eight, and the actual number 350 may correspond to six (if two repetitions are canceled) or seven (if one repetition is canceled).

In example 610, the UE 115 is configured to apply the same DMRS sharing pattern to remaining repetitions of the uplink transmission 332 (e.g., irrespective of the actual number 350). For example, after cancelation of repetitions 3 and 8, other repetitions remain "as is" in the uplink transmission 332 (as compared to example 410).

In example 620, the UE 115 is configured to re-determine the DMRS sharing pattern 310 based on the actual number 350 and in response to detecting a canceled repetition of the uplink transmission. To illustrate, prior to detecting the puncturing event, the UE 115 may select a DMRS sharing pattern 310 associated with a configured number 326 of eight (such as the DMRS sharing pattern 310 depicted in example 410). The UE 115 may transmit (or prepare to transmit) repetitions 1 and 2 based on the DMRS sharing pattern associated with a configured number 326 of eight.

In some cases, the UE 115 may detect a puncturing event associated with cancelation of repetition 3. Upon detecting cancelation of repetition 3, the UE 115 may determine that five repetitions 622 of the uplink transmission 332 remain after canceled repetition 3. The UE 115 may be configured to access the control information 302 to re-determine the DMRS sharing pattern 310 by identifying a DMRS sharing pattern associated with an actual number 350 of five. The UE 115 may be configured to apply the re-determined DMRS sharing pattern 310 to the remaining repetitions 622 of the uplink transmission 332.

Referring again to FIG. 3, in some examples, the one or more parameters 308 include a configured number 354 of DMRS symbols 338 per repetition 334 of the uplink transmission 332. In some implementations, the base station 105 may indicate the configured number to the UE 115, such as via the scheduling message 324. The configured number 354 may indicate a "maximum" or "nominal" number of the DMRS symbols 338 per repetition 334 of the uplink transmission 332, which may be reduced in some circumstances (e.g., based on a symbol reducing event).

In some examples, a number of DMRS sharing patterns 306 available for the uplink transmission 332 as indicated by the control information 302 is based on the configured number 354. To illustrate, in some examples, the control information 302 may include one number of DMRS sharing patterns 306 for a first value of the configured number 354 and may include another number of DMRS sharing patterns 306 for a second value of the configured number 354. As an illustrative non-limiting example, if the configured number 354 indicates a maximum of one DMRS symbol 338 per repetition 334 or two DMRS symbols 338 per repetition 334, then the control information 302 may indicate four DMRS sharing patterns 306 or eight DMRS sharing patterns 306, respectively.

Alternatively or in addition, the DMRS sharing factor 330 of the uplink transmission 332 (or a set of DMRS sharing factors 330 available for the uplink transmission 332) may be based on the configured number 354. As an illustrative non-limiting example, if the configured number 354 indicates a maximum of one DMRS symbol 338 per repetition 334 or two DMRS symbols 338 per repetition 334, then the control information 302 may indicate a first set of values available for the DMRS sharing factor 330 (e.g., one, two, or four) or a second set of values available for the DMRS sharing factor 330 (e.g., one, two, four, or eight), respectively.

Further, in some examples, the one or more parameters 308 include an actual number 356 of DMRS symbols 338 per repetition 334 of the uplink transmission 332. In some implementations, the actual number 356 is less than the configured number 354 (e.g., due to a symbol reducing event that occurs after scheduling of the uplink transmission 332).

In some examples, a number of DMRS sharing patterns 306 available for the uplink transmission 332 as indicated by the control information 302 is based on the actual number 356. To illustrate, in some examples, the control information 302 may include one number of DMRS sharing patterns 306 for a first value of the actual number 356 and may include another number of DMRS sharing patterns 306 for a second value of the actual number 356. As an illustrative non-limiting example, if the actual number 356 indicates one DMRS symbol 338 per repetition 334 or two DMRS symbols 338 per repetition 334, then the control information 302 may indicate four DMRS sharing patterns 306 or eight DMRS sharing patterns 306, respectively.

Alternatively or in addition, the DMRS sharing factor 330 of the uplink transmission 332 (or a set of DMRS sharing factors 330 available for the uplink transmission 332) may be based on the actual number 356. As an illustrative non-limiting example, if the actual number 356 indicates a maximum of one DMRS symbol 338 per repetition 334 or two DMRS symbols 338 per repetition 334, then the control information 302 may indicate a first set of values available for the DMRS sharing factor 330 (e.g., one, two, or four) or a second set of values available for the DMRS sharing factor 330 (e.g., one, two, four, or eight), respectively.

The one or more parameters 308 may include a repetition type 352 of the uplink transmission 332. In some examples, one or more of the base station 105 or the UE 115 are configured to determine the repetition type 352 from among multiple repetition types and to determine the DMRS sharing pattern 310 based on the repetition type 352. To illustrate, the multiple repetition types may include a first repetition type associated with at most one repetition per slot and may further include a second repetition type associated with one or more repetitions per slot. The first repetition type may correspond to PUSCH repetition type "A" specified by a 5G NR wireless communication protocol, and the second repetition type may correspond to PUSCH repetition type "B" specified by the 5G NR wireless communication protocol.

Further, it is noted that one or more aspects herein may be performed on a per-repetition type basis. For example, the control information 302 may include a first version of the DMRS sharing patterns 306 for the first repetition type and may further include a second version of the DMRS sharing patterns 306 for the second repetition type. In one example, the UE 115 is configured to report, to the base station 105, first capabilities supporting DMRS sharing for the first repetition type and second capabilities supporting DMRS sharing for the second repetition type.

One or more aspects described with reference to FIGS. 3-6 may improve efficiency or performance of a wireless communication system. For example, by determining a DMRS sharing pattern 310 for an uplink transmission 332 based on one or more parameters 308 of the uplink transmission 332, the DMRS sharing pattern 310 can be "customized" or "tailored" to the particular uplink transmission 332. As a result, uplink transmissions of different parameters can be associated with different DMRS sharing patterns, which may increase efficiency or performance in some cases as compared to certain other techniques that use a common DMRS sharing pattern for uplink transmission of different parameters.

Although certain examples of DMRS sharing have been described with reference to the uplink transmission 332 by the UE 115 to the base station 105, in some other examples, one or more examples described herein may be applied to one or more other transmissions (alternatively or in addition to the uplink transmission 332). For example, the base station 105 may send (e.g., to the UE 115) a downlink transmission associated with a DMRS sharing pattern of the DMRS sharing patterns 306. As another example, the UE 115 may send (e.g., to another UE 115) a sidelink transmission associated with a DMRS sharing pattern of the DMRS sharing patterns 306.

To further illustrate, a method may include communicating, by a first device with a second device, the control information 302. The control information 302 may indicate a mapping of transmission parameters (such as uplink transmission parameters, downlink transmission parameters, sidelink transmission parameters, or a combination thereof) to one or more DMRS sharing patterns (e.g., the DMRS sharing patterns 306). The method may further include communicating, by the first device with the second device, a transmission in accordance with a DMRS sharing pattern, where the DMRS sharing pattern is selected from among the one or more DMRS sharing patterns based on one or more parameters of the transmission. In some examples, the first device corresponds to the base station 105, the second device corresponds to the UE 115, and the transmission corresponds to a downlink transmission. In some other examples, the first device corresponds to the UE 115, the second device corresponds to the base station 105, and the transmission corresponds to an uplink transmission. In some other examples, the first device corresponds to the UE 115, the second device corresponds to another UE 115, and the transmission corresponds to a sidelink transmission. As used herein, "communicating" a transmission may refer to receiving the transmission or to sending the transmission.

Figures 7, 8:
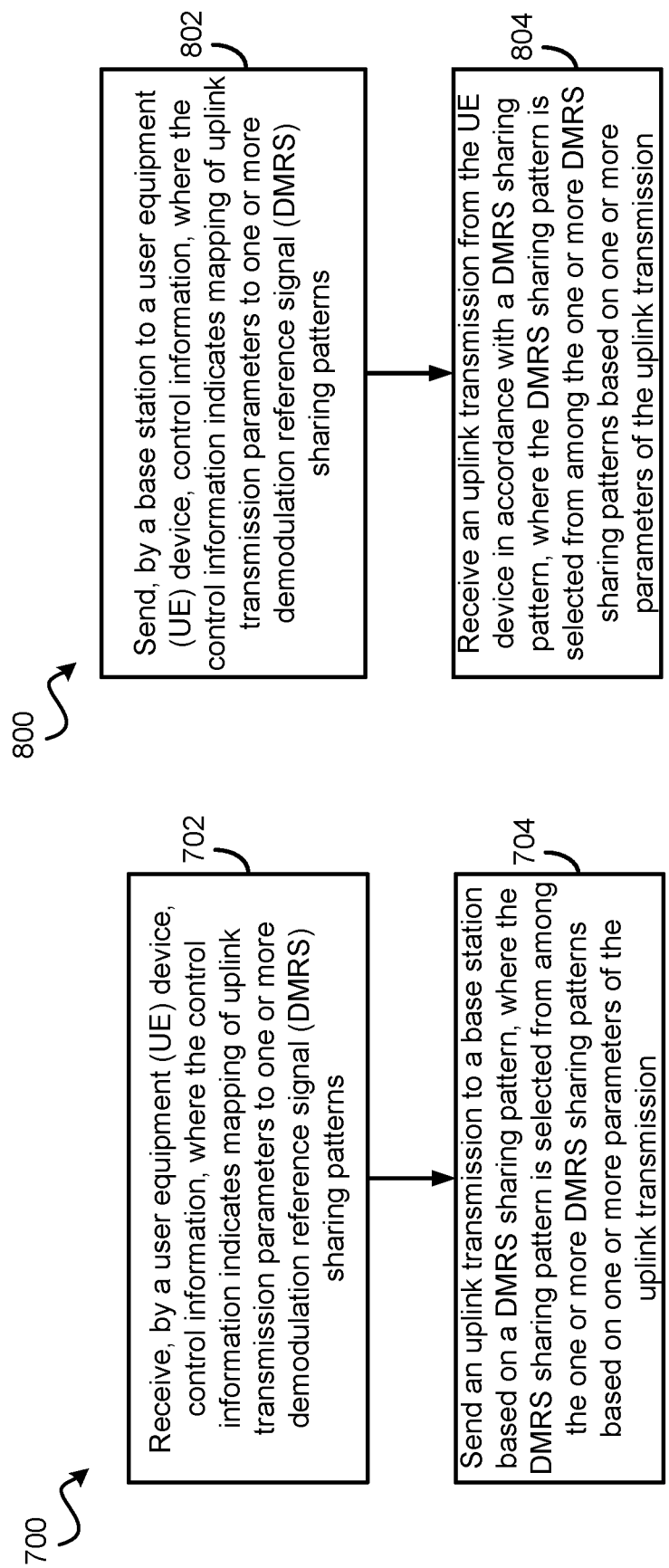
FIG. 7 is a flow chart of an example of a method of wireless communication according to some aspects of the present disclosure.
FIG. 8 is a flow chart of another example of a method of wireless communication according to some aspects of the present disclosure.

Referring to FIG. 7, a particular illustrative example of a method of wireless communication is depicted and generally designated 700. In some examples, the UE 115 is configured to perform operations of the method 700 of FIG. 7.

The method 700 includes receiving, by a UE device, control information, at 702. The control information indicates mapping of uplink transmission parameters to one or more DMRS sharing patterns. For example, the UE 115 may receive the one or more configuration messages 320 indicating the control information 302. The control information 302 indicates mapping of the uplink transmission parameters 304 to one or more DMRS sharing patterns, such as the DMRS sharing patterns 306.

The method 700 further includes sending an uplink transmission to a base station based on a DMRS sharing pattern, where the DMRS sharing pattern is selected from among the one or more DMRS sharing patterns based on one or more parameters of the uplink transmission, at 704. For example, the UE 115 may determine the DMRS sharing pattern 310 from among the DMRS sharing patterns 306 based on the one or more parameters 308 of the uplink transmission 332 and may send the uplink transmission 332 to the base station 105 in accordance with the DMRS sharing pattern 310.

Referring to FIG. 8, a particular illustrative example of a method of wireless communication is depicted and generally designated 800. In some examples, the base station 105 is configured to perform operations of the method 800 of FIG. 8.

The method 800 includes sending, by a base station to a UE device, control information, at 802. The control information indicates mapping of uplink transmission parameters to one or more DMRS sharing patterns. For example, the base station 105 may send to the UE 115 the one or more configuration messages 320 indicating the control information 302. The control information 302 indicates mapping of the uplink transmission parameters 304 to one or more DMRS sharing patterns, such as the DMRS sharing patterns 306.

The method 800 further includes receiving an uplink transmission from the UE device in accordance with a DMRS sharing pattern, where the DMRS sharing pattern is selected from among the one or more DMRS sharing patterns based on one or more parameters of the uplink transmission, at 804. For example, the base station 105 may determine the DMRS sharing pattern 310 from among the DMRS sharing patterns 306 based on the one or more parameters 308 of the uplink transmission 332 and may receive the uplink transmission 332 from the UE 115 in accordance with the DMRS sharing pattern 310.

Figure 9:
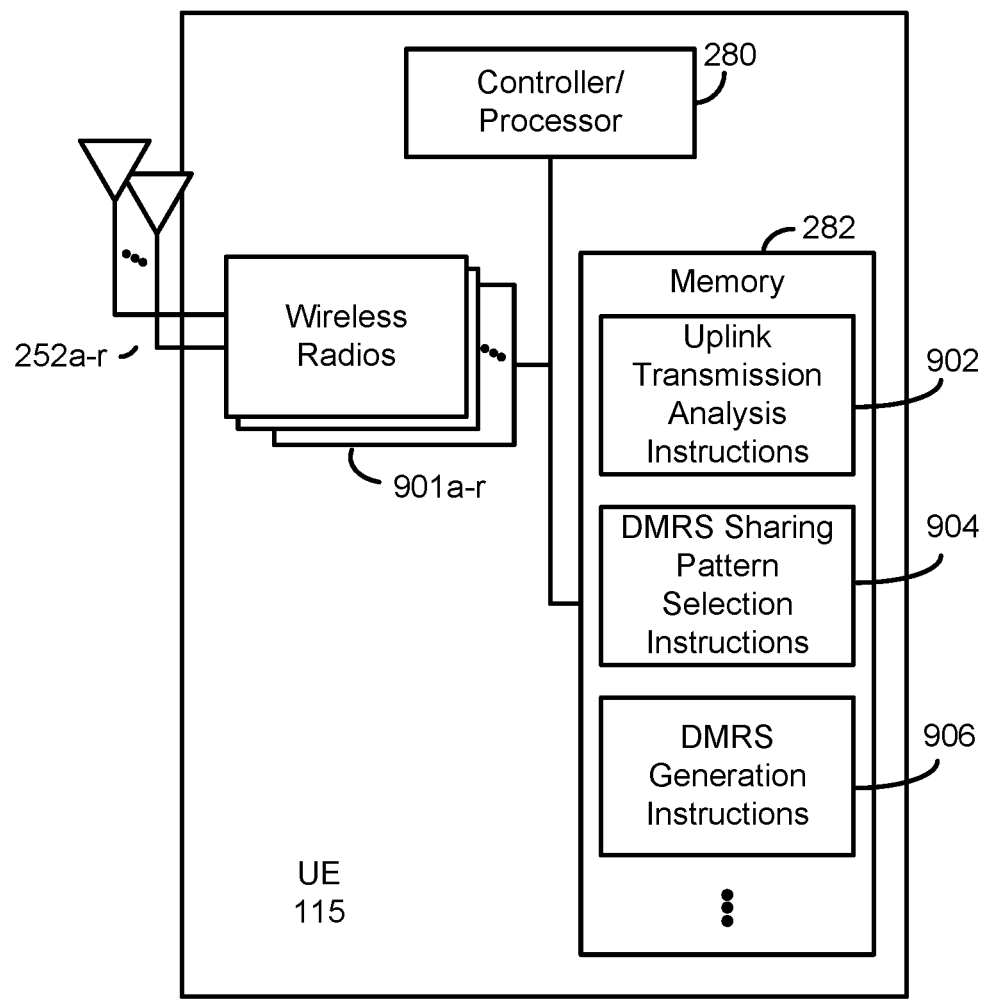
FIG. 9 is a block diagram conceptually illustrating an example of a UE configured to perform DMRS sharing pattern selection according to some aspects of the present disclosure.

FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which is configured to execute logic or computer instructions stored in memory 282 and to control one or more components of UE 115 that provide the features and functionality of UE 115. UE 115, under control of controller/processor 280, transmits and receives signals via wireless radios 901*a-r* and antennas 252*a-r*. Wireless radios 901*a-r* include various components and hardware of FIG. 2, including modulator/demodulators 254*a-r*, MIMO detector 256, receive processor 258, transmit processor 264, and TX MIMO processor 266.

The memory 282 is configured to store instructions executable by the controller/processor 280 to initiate, control, or perform one or more operations described herein. For example, the memory 282 may store uplink transmission analysis instructions 902 executable by the controller/processor 280 to analyze one or more aspects of the uplink transmission 332 (e.g., based on the scheduling message 324, an indication of the DMRS sharing configuration parameter 328, an indication of the DMRS sharing factor 330, other information, or a combination thereof) to identify the one or more parameters 308. As another example, the memory 282 may store DMRS sharing pattern selection instructions 904 executable by the controller/processor 280 to select the DMRS sharing pattern 310 from the control information 302 based on the one or more parameters 308. As an additional example, the memory 282 may store DMRS generation instructions 906 executable by the controller/processor 280 to cause the wireless radios 901*a-r* to generate the uplink transmission 332 in accordance with the DMRS sharing pattern 310.

Figure 10:
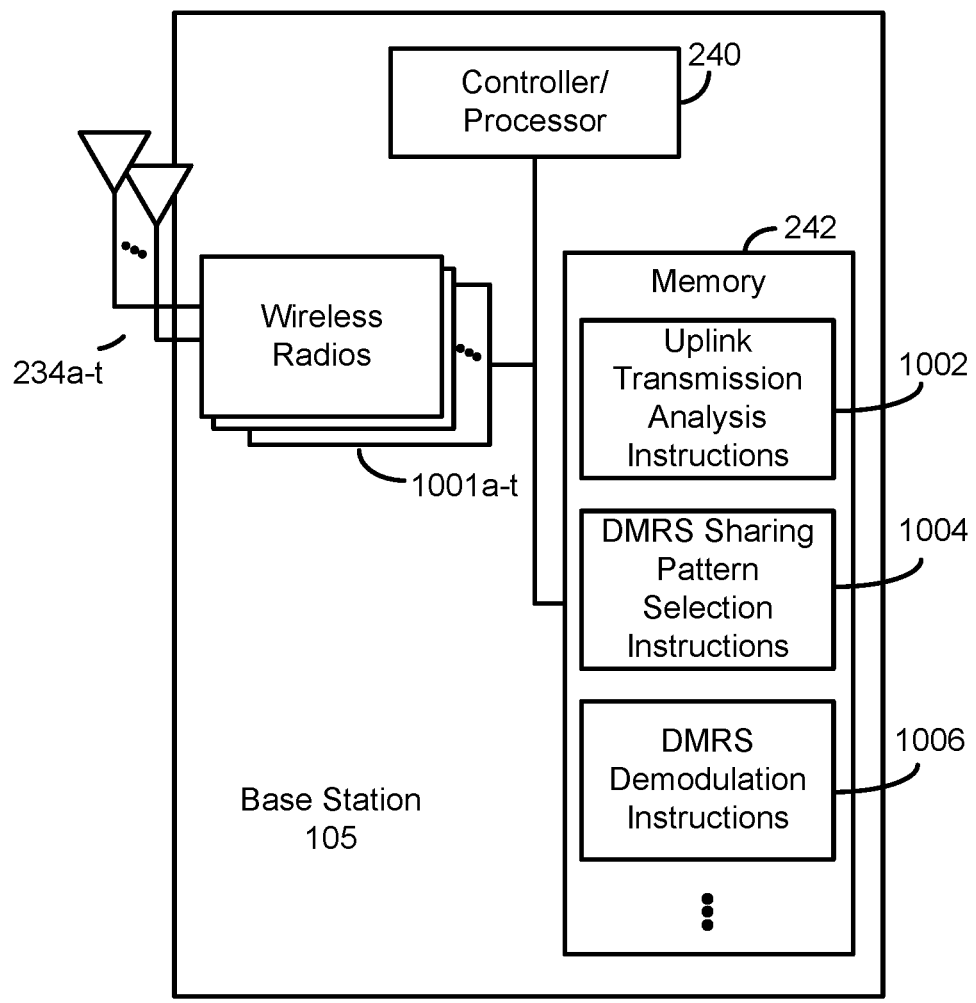
FIG. 10 is a block diagram illustrating an example of a design of a base station configured to perform DMRS sharing pattern selection according to some aspects of the present disclosure.

FIG. 10 is a block diagram illustrating base station 105 configured according to one aspect of the present disclosure. Base station 105 includes the structure, hardware, and components as illustrated in FIG. 2. For example, base station 105 includes controller/processor 240, which is configured to execute logic or computer instructions stored in memory 242 and to control one or more components of base station 105 that provide the features and functionality of base station 105. Base station 105, under control of controller/processor 240, transmits and receives signals via wireless radios 1001*a-t* and antennas 234*a-t*. Wireless radios 1001*a-t* include various components and hardware of FIG. 2, including modulator/demodulators 232*a-t*, MIMO detector 236, receive processor 238, transmit processor 220, and TX MIMO processor 230.

The memory 242 is configured to store instructions executable by the controller/processor 240 to initiate, control, or perform one or more operations described herein. For example, the memory 242 may store uplink transmission analysis instructions 1002 executable by the controller/processor 240 to analyze one or more aspects of the uplink transmission 332 (e.g., based on the scheduling message 324, an indication of the DMRS sharing configuration parameter 328, an indication of the DMRS sharing factor 330, other information, or a combination thereof) to identify the one or more parameters 308. As another example, the memory 242 may store DMRS sharing pattern selection instructions 1004 executable by the controller/processor 240 to select the DMRS sharing pattern 310 from the control information 302 based on the one or more parameters 308. As an additional example, the memory 242 may store DMRS demodulation instructions 1006 executable by the controller/processor 240 to cause the wireless radios 1001*a-t* to receive the uplink transmission 332 in accordance with the DMRS sharing pattern 310 (e.g., by demodulating the repetitions 334 based on the DMRS sharing pattern 310).

In a first aspect, a method of wireless communication includes receiving, by a user equipment (UE) device, one or more configuration messages including control information, where the control information indicates mapping of uplink transmission parameters to demodulation reference signal (DMRS) sharing patterns. The method further includes, based on one or more parameters of an uplink transmission, determining a DMRS sharing pattern of the uplink transmission from among the DMRS sharing patterns indicated by the control information and sending the uplink transmission to a base station in accordance with the DMRS sharing pattern.

In a second aspect alternatively or in addition to the first aspect, the uplink transmission includes multiple uplink repetitions of the same uplink channel, and the DMRS sharing pattern indicates an ordering of one or more uplink repetitions of the multiple uplink repetitions that include a DMRS and one or more other uplink repetitions of the multiple uplink repetitions of the uplink channel that do not include the DMRS and that are to be demodulated based on the DMRS.

In a third aspect alternatively or in addition to one or more of the first through second aspects, the method further includes receiving, from the base station, a message scheduling the uplink transmission and including a configured number of repetitions of the uplink transmission, and the one or more parameters include the configured number of repetitions of the uplink transmission.

In a fourth aspect alternatively or in addition to one or more of the first through third aspects, the uplink transmission corresponds to a single physical uplink shared channel (PUSCH) transmission with repetitions that span across multiple symbols in one or more slots.

In a fifth aspect alternatively or in addition to one or more of the first through fourth aspects, the DMRS sharing pattern is based on a number of repetitions that is less than the configured number, and the method further includes repeating the DMRS sharing pattern across the configured number of repetitions of the uplink transmission.

In a sixth aspect alternatively or in addition to one or more of the first through fifth aspects, the DMRS sharing patterns include multiple DMRS sharing patterns for a configured number of repetitions and for a DMRS sharing factor of the uplink transmission.

In a seventh aspect alternatively or in addition to one or more of the first through sixth aspects, the DMRS sharing pattern is selected from among the multiple DMRS sharing patterns.

In an eighth aspect alternatively or in addition to one or more of the first through seventh aspects, the DMRS sharing pattern is selected from among the multiple DMRS sharing patterns dynamically or is indicated by a DMRS sharing configuration parameter indicated by the base station via radio resource control (RRC) configuration signaling, downlink control information (DCI) signaling, or medium access control (MAC) control element (MAC-CE) signaling.

In a ninth aspect alternatively or in addition to one or more of the first through eighth aspects, the method further includes receiving an indication of the DMRS sharing factor from the base station.

In a tenth aspect alternatively or in addition to one or more of the first through ninth aspects, the method further includes determining, from among multiple repetition types, a repetition type of the uplink transmission, and the DMRS sharing pattern is determined based on the repetition type.

In an eleventh aspect alternatively or in addition to one or more of the first through tenth aspects, the multiple repetition types include a first repetition type associated with at most one repetition per slot and further include a second repetition type associated with one or more repetitions per slot, and the method further includes reporting, by the UE device to the base station, first capabilities supporting DMRS sharing for the first repetition type and second capabilities supporting DMRS sharing for the second repetition type.

In a twelfth aspect alternatively or in addition to one or more of the first through eleventh aspects, the method further includes detecting a puncturing event associated with modification of the uplink transmission from a configured number of repetitions to an actual number of repetitions that is less than the configured number.

In a thirteenth aspect alternatively or in addition to one or more of the first through twelfth aspects, the method further includes applying the DMRS sharing pattern to the repetitions of the uplink transmission irrespective of the actual number.

In a fourteenth aspect alternatively or in addition to one or more of the first through thirteenth aspects, the method further includes, in response to detecting a canceled repetition of the uplink transmission, re-determining the DMRS sharing pattern based on the actual number of repetitions and applying the re-determined DMRS sharing pattern to remaining repetitions of the uplink transmission.

In a fifteenth aspect alternatively or in addition to one or more of the first through fourteenth aspects, the one or more parameters of the uplink transmission include a configured number of DMRS symbols per repetition of the uplink transmission.

In a sixteenth aspect alternatively or in addition to one or more of the first through fifteenth aspects, a number of DMRS sharing patterns available for the uplink transmission as indicated by the control information is based on the configured number of DMRS symbols.

In a seventeenth aspect alternatively or in addition to one or more of the first through sixteenth aspects, a DMRS sharing factor for the uplink transmission as indicated by the control information is based on the configured number of DMRS symbols.

In an eighteenth aspect alternatively or in addition to one or more of the first through seventeenth aspects, the one or more parameters of the uplink transmission include an actual number of DMRS symbols per repetition of the uplink transmission.

In a nineteenth aspect alternatively or in addition to one or more of the first through eighteenth aspects, one or more of a number of DMRS sharing patterns available for the uplink transmission or a DMRS sharing factor for the uplink transmission are based on the actual number of DMRS symbols.

In a twentieth aspect alternatively or in addition to one or more of the first through nineteenth aspects, a method is in accordance with any combination of the first through nineteenth aspects.

In a twenty-first aspect alternatively or in addition to one or more of the first through twentieth aspects, a method of wireless communication includes sending, by a base station to a user equipment (UE) device, one or more configuration messages including control information, where the control information indicates mapping of uplink transmission parameters to demodulation reference signal (DMRS) sharing patterns; based on one or more parameters of an uplink transmission, determining a DMRS sharing pattern of the uplink transmission from among the DMRS sharing patterns indicated by the control information; and receiving the uplink transmission from the UE device in accordance with the DMRS sharing pattern.

In a twenty-second aspect alternatively or in addition to one or more of the first through twenty-first aspects, the uplink transmission includes multiple uplink repetitions of the same uplink channel, and the DMRS sharing pattern indicates an ordering of one or more uplink repetitions of the multiple uplink repetitions that include a DMRS and one or more other uplink repetitions of the multiple uplink repetitions of the uplink channel that do not include the DMRS and that are to be demodulated based on the DMRS.

In a twenty-third aspect alternatively or in addition to one or more of the first through twenty-second aspects, the method further includes sending, from the base station to the UE device, a message scheduling the uplink transmission and including a configured number of repetitions of the uplink transmission, and the one or more parameters include the configured number of repetitions of the uplink transmission.

In a twenty-fourth aspect alternatively or in addition to one or more of the first through twenty-third aspects, the uplink transmission corresponds to a single physical uplink shared channel (PUSCH) transmission with repetitions that span across multiple symbols in one or more slots.

In a twenty-fifth aspect alternatively or in addition to one or more of the first through twenty-fourth aspects, the DMRS sharing pattern is based on a number of repetitions that is less than the configured number, and the DMRS sharing pattern repeats across the configured number of repetitions of the uplink transmission.

In a twenty-sixth aspect alternatively or in addition to one or more of the first through twenty-fifth aspects, the DMRS sharing patterns of the control information include multiple DMRS sharing patterns for a configured number of repetitions and for a DMRS sharing factor of the uplink transmission.

In a twenty-seventh aspect alternatively or in addition to one or more of the first through twenty-sixth aspects, the DMRS sharing pattern is selected from among the multiple DMRS sharing patterns.

In a twenty-eighth aspect alternatively or in addition to one or more of the first through twenty-seventh aspects, the DMRS sharing pattern is selected from among the multiple DMRS sharing patterns dynamically or is indicated by a DMRS sharing configuration parameter indicated by the base station via radio resource control (RRC) configuration signaling, downlink control information (DCI) signaling, or medium access control (MAC) control element (MAC-CE) signaling.

In a twenty-ninth aspect alternatively or in addition to one or more of the first through twenty-eighth aspects, the method further includes sending an indication of the DMRS sharing factor from the base station to the UE device.

In a thirtieth aspect alternatively or in addition to one or more of the first through twenty-ninth aspects, the method further includes determining, from among multiple repetition types, a repetition type of the uplink transmission, and the DMRS sharing pattern is determined based on the repetition type.

In a thirty-first aspect alternatively or in addition to one or more of the first through thirtieth aspects, the multiple repetition types include a first repetition type associated with at most one repetition per slot and further include a second repetition type associated with one or more repetitions per slot, and the method further includes receiving, from the UE device at the base station, reporting of first capabilities supporting DMRS sharing for the first repetition type and second capabilities supporting DMRS sharing for the second repetition type.

In a thirty-second aspect alternatively or in addition to one or more of the first through thirty-first aspects, the method further includes detecting a puncturing event associated with modification of the uplink transmission from a configured number of repetitions to an actual number of remaining repetitions that is less than the configured number.

In a thirty-third aspect alternatively or in addition to one or more of the first through thirty-second aspects, the DMRS sharing pattern is applied to the remaining repetitions of the uplink transmission irrespective of the actual number.

In a thirty-fourth aspect alternatively or in addition to one or more of the first through thirty-third aspects, the DMRS sharing pattern is re-determined in response to detecting a canceled repetition of the uplink transmission, and the re-determined DMRS sharing pattern is applied to the remaining repetitions.

In a thirty-fifth aspect alternatively or in addition to one or more of the first through thirty-fourth aspects, the one or more parameters of the uplink transmission include a configured number of DMRS symbols per repetition of the uplink transmission.

In a thirty-sixth aspect alternatively or in addition to one or more of the first through thirty-fifth aspects, a number of DMRS sharing patterns available for the uplink transmission as indicated by the control information is based on the configured number of DMRS symbols.

In a thirty-seventh aspect alternatively or in addition to one or more of the first through thirty-sixth aspects, a DMRS sharing factor for the uplink transmission as indicated by the control information is based on the configured number of DMRS symbols.

In a thirty-eighth aspect alternatively or in addition to one or more of the first through thirty-seventh aspects, the one or more parameters of the uplink transmission include an actual number of DMRS symbols per repetition of the uplink transmission.

In a thirty-ninth aspect alternatively or in addition to one or more of the first through thirty-eighth aspects, one or more of a number of DMRS sharing patterns available for the uplink transmission or a DMRS sharing factor for the uplink transmission are based on the actual number of DMRS symbols.

In a fortieth aspect alternatively or in addition to one or more of the first through thirty-ninth aspects, a method is in accordance with any combination of the twenty-first through thirty-ninth aspects.

In a forty-first aspect alternatively or in addition to one or more of the first through fortieth aspects, an apparatus for wireless communication includes a memory; and one or more processors coupled to the memory and configured to: receive, at a user equipment (UE) device, one or more configuration messages including control information, where the control information indicates mapping of uplink transmission parameters to demodulation reference signal (DMRS) sharing patterns; based on one or more parameters of an uplink transmission, determine a DMRS sharing pattern of the uplink transmission from among the DMRS sharing patterns indicated by the control information; and initiate sending the uplink transmission to a base station in accordance with the DMRS sharing pattern.

In a forty-second aspect alternatively or in addition to one or more of the first through forty-first aspects, the uplink transmission includes multiple uplink repetitions of the same uplink channel, and the DMRS sharing pattern indicates an ordering of one or more uplink repetitions of the multiple uplink repetitions that include a DMRS and one or more other uplink repetitions of the multiple uplink repetitions of the uplink channel that do not include the DMRS and that are to be demodulated based on the DMRS.

In a forty-third aspect alternatively or in addition to one or more of the first through forty-second aspects, the one or more processors are further configured to receive, from the base station, a message scheduling the uplink transmission and including a configured number of repetitions of the uplink transmission, and the one or more parameters include the configured number of repetitions of the uplink transmission.

In a forty-fourth aspect alternatively or in addition to one or more of the first through forty-third aspects, the uplink transmission corresponds to a single physical uplink shared channel (PUSCH) transmission with repetitions that span across multiple symbols in one or more slots.

In a forty-fifth aspect alternatively or in addition to one or more of the first through forty-fourth aspects, the DMRS sharing pattern is based on a number of repetitions that is less than the configured number, and the one or more processors are further configured to repeat the DMRS sharing pattern across the configured number of repetitions of the uplink transmission.

In a forty-sixth aspect alternatively or in addition to one or more of the first through forty-fifth aspects, the DMRS sharing patterns of the control information include multiple DMRS sharing patterns for a configured number of repetitions and for a DMRS sharing factor of the uplink transmission.

In a forty-seventh aspect alternatively or in addition to one or more of the first through forty-sixth aspects, the one or more processors are further configured to select the DMRS sharing pattern from among the multiple DMRS sharing patterns.

In a forty-eighth aspect alternatively or in addition to one or more of the first through forty-seventh aspects, the DMRS sharing pattern is selected from among the multiple DMRS sharing patterns dynamically or is indicated by a DMRS sharing configuration parameter indicated by the base station via radio resource control (RRC) configuration signaling, downlink control information (DCI) signaling, or medium access control (MAC) control element (MAC-CE) signaling.

In a forty-ninth aspect alternatively or in addition to one or more of the first through forty-eighth aspects, the one or more processors are further configured to receive an indication of the DMRS sharing factor from the base station.

In a fiftieth aspect alternatively or in addition to one or more of the first through forty-ninth aspects, the one or more processors are further configured to determine, from among multiple repetition types, a repetition type of the uplink transmission and to determine the DMRS sharing pattern based on the repetition type.

In a fifty-first aspect alternatively or in addition to one or more of the first through fiftieth aspects, the multiple repetition types include a first repetition type associated with at most one repetition per slot and further include a second repetition type associated with one or more repetitions per slot, and the one or more processors are further configured to report, by the UE device to the base station, first capabilities supporting DMRS sharing for the first repetition type and second capabilities supporting DMRS sharing for the second repetition type.

In a fifty-second aspect alternatively or in addition to one or more of the first through fifty-first aspects, the one or more processors are further configured to detect a puncturing event associated with modification of the uplink transmission from a configured number of repetitions to an actual number of repetitions that is less than the configured number.

In a fifty-third aspect alternatively or in addition to one or more of the first through fifty-second aspects, the one or more processors are further configured to apply the DMRS sharing pattern to the repetitions of the uplink transmission irrespective of the actual number.

In a fifty-fourth aspect alternatively or in addition to one or more of the first through fifty-third aspects, the one or more processors are further configured to: in response to detecting a canceled repetition of the uplink transmission, re-determine the DMRS sharing pattern based on the actual number of repetitions; and apply the re-determined DMRS sharing pattern to remaining repetitions of the uplink transmission.

In a fifty-fifth aspect alternatively or in addition to one or more of the first through fifty-fourth aspects, the one or more parameters of the uplink transmission include a configured number of DMRS symbols per repetition of the uplink transmission.

In a fifty-sixth aspect alternatively or in addition to one or more of the first through fifty-fifth aspects, a number of DMRS sharing patterns available for the uplink transmission as indicated by the control information is based on the configured number of DMRS symbols.

In a fifty-seventh aspect alternatively or in addition to one or more of the first through fifty-sixth aspects, a DMRS sharing factor for the uplink transmission as indicated by the control information is based on the configured number of DMRS symbols.

In a fifty-eighth aspect alternatively or in addition to one or more of the first through fifty-seventh aspects, the one or more parameters of the uplink transmission include an actual number of DMRS symbols per repetition of the uplink transmission.

In a fifty-ninth aspect alternatively or in addition to one or more of the first through fifty-eighth aspects, one or more of a number of DMRS sharing patterns available for the uplink transmission or a DMRS sharing factor for the uplink transmission are based on the actual number of DMRS symbols.

In a sixtieth aspect alternatively or in addition to one or more of the first through fifty-ninth aspects, an apparatus is in accordance with any combination of the fortieth through fifty-ninth aspects.

In a sixty-first aspect alternatively or in addition to one or more of the first through sixtieth aspects, an apparatus for wireless communication includes a memory; and one or more processors coupled to the memory and configured to: initiate sending, from a base station to a user equipment (UE) device, one or more configuration messages including control information, where the control information indicates mapping of uplink transmission parameters to demodulation reference signal (DMRS) sharing patterns; based on one or more parameters of an uplink transmission, determine a DMRS sharing pattern of the uplink transmission from among the DMRS sharing patterns indicated by the control information; and receive the uplink transmission from the UE device in accordance with the DMRS sharing pattern.

In a sixty-second aspect alternatively or in addition to one or more of the first through sixty-first aspects, the uplink transmission includes multiple uplink repetitions of the same uplink channel, and the DMRS sharing pattern indicates an ordering of one or more uplink repetitions of the multiple uplink repetitions that include a DMRS and one or more other uplink repetitions of the multiple uplink repetitions of the uplink channel that do not include the DMRS and that are to be demodulated based on the DMRS.

In a sixty-third aspect alternatively or in addition to one or more of the first through sixty-second aspects, the one or more processors are further configured to send, from the base station to the UE device, a message scheduling the uplink transmission and including a configured number of repetitions of the uplink transmission, and the one or more parameters include the configured number of repetitions of the uplink transmission.

In a sixty-fourth aspect alternatively or in addition to one or more of the first through sixty-third aspects, the uplink transmission corresponds to a single physical uplink shared channel (PUSCH) transmission with repetitions that span across multiple symbols in one or more slots.

In a sixty-fifth aspect alternatively or in addition to one or more of the first through sixty-fourth aspects, the DMRS sharing pattern is based on a number of repetitions that is less than the configured number, and the DMRS sharing pattern repeats across the configured number of repetitions of the uplink transmission.

In a sixty-sixth aspect alternatively or in addition to one or more of the first through sixty-fifth aspects, the DMRS sharing patterns of the control information include multiple DMRS sharing patterns for a configured number of repetitions and for a DMRS sharing factor of the uplink transmission.

In a sixty-seventh aspect alternatively or in addition to one or more of the first through sixty-sixth aspects, the one or more processors are further configured to select the DMRS sharing pattern from among the multiple DMRS sharing patterns.

In a sixty-eighth aspect alternatively or in addition to one or more of the first through sixty-seventh aspects, the DMRS sharing pattern is selected from among the multiple DMRS sharing patterns dynamically or is indicated by a DMRS sharing configuration parameter indicated by the base station via radio resource control (RRC) configuration signaling, downlink control information (DCI) signaling, or medium access control (MAC) control element (MAC-CE) signaling.

In a sixty-ninth aspect alternatively or in addition to one or more of the first through sixty-eighth aspects, the one or more processors are further configured to send an indication of the DMRS sharing factor from the base station to the UE device.

In a seventieth aspect alternatively or in addition to one or more of the first through sixty-ninth aspects, the one or more processors are further configured to determine, from among multiple repetition types, a repetition type of the uplink transmission and to determine the DMRS sharing pattern based on the repetition type.

In a seventy-first aspect alternatively or in addition to one or more of the first through seventieth aspects, the multiple repetition types include a first repetition type associated with at most one repetition per slot and further include a second repetition type associated with one or more repetitions per slot, and the one or more processors are further configured to receive, from the UE device at the base station, reporting of first capabilities supporting DMRS sharing for the first repetition type and second capabilities supporting DMRS sharing for the second repetition type.

In a seventy-second aspect alternatively or in addition to one or more of the first through seventy-first aspects, the one or more processors are further configured to detect a puncturing event associated with modification of the uplink transmission from a configured number of repetitions to an actual number of remaining repetitions that is less than the configured number.

In a seventy-third aspect alternatively or in addition to one or more of the first through seventy-second aspects, the DMRS sharing pattern is applied to the remaining repetitions of the uplink transmission irrespective of the actual number.

In a seventy-fourth aspect alternatively or in addition to one or more of the first through seventy-third aspects, the DMRS sharing pattern is re-determined in response to detecting a canceled repetition of the uplink transmission, and the re-determined DMRS sharing pattern is applied to the remaining repetitions.

In a seventy-fifth aspect alternatively or in addition to one or more of the first through seventy-fourth aspects, the one or more parameters of the uplink transmission include a configured number of DMRS symbols per repetition of the uplink transmission.

In a seventy-sixth aspect alternatively or in addition to one or more of the first through seventy-fifth aspects, a number of DMRS sharing patterns available for the uplink transmission as indicated by the control information is based on the configured number of DMRS symbols.

In a seventy-seventh aspect alternatively or in addition to one or more of the first through seventy-sixth aspects, a DMRS sharing factor for the uplink transmission as indicated by the control information is based on the configured number of DMRS symbols.

In a seventy-eighth aspect alternatively or in addition to one or more of the first through seventy-seventh aspects, the one or more parameters of the uplink transmission include an actual number of DMRS symbols per repetition of the uplink transmission.

In a seventy-ninth aspect alternatively or in addition to one or more of the first through seventy-eighth aspects, one or more of a number of DMRS sharing patterns available for the uplink transmission or a DMRS sharing factor for the uplink transmission are based on the actual number of DMRS symbols.

In an eightieth aspect alternatively or in addition to one or more of the first through seventy-ninth aspects, an apparatus is in accordance with any combination of the sixty-first through seventy-ninth aspects.

In an eighty-first aspect alternatively or in addition to one or more of the first through eightieth aspects, a non-transitory computer-readable medium stores instructions executable by a processor to perform operations, the operations comprising: receiving, by a user equipment (UE) device, one or more configuration messages including control information, where the control information indicates mapping of uplink transmission parameters to demodulation reference signal (DMRS) sharing patterns; based on one or more parameters of an uplink transmission, determining a DMRS sharing pattern of the uplink transmission from among the DMRS sharing patterns indicated by the control information; and sending the uplink transmission to a base station in accordance with the DMRS sharing pattern.

In an eighty-second aspect alternatively or in addition to one or more of the first through eighty-first aspects, the uplink transmission includes multiple uplink repetitions of the same uplink channel, and the DMRS sharing pattern indicates an ordering of one or more uplink repetitions of the multiple uplink repetitions that include a DMRS and one or more other uplink repetitions of the multiple uplink repetitions of the uplink channel that do not include the DMRS and that are to be demodulated based on the DMRS.

In an eighty-third aspect alternatively or in addition to one or more of the first through eighty-second aspects, the operations further include receiving, from the base station, a message scheduling the uplink transmission and including a configured number of repetitions of the uplink transmission, and the one or more parameters include the configured number of repetitions of the uplink transmission.

In an eighty-fourth aspect alternatively or in addition to one or more of the first through eighty-third aspects, the uplink transmission corresponds to a single physical uplink shared channel (PUSCH) transmission with repetitions that span across multiple symbols in one or more slots.

In an eighty-fifth aspect alternatively or in addition to one or more of the first through eighty-fourth aspects, the DMRS sharing pattern is based on a number of repetitions that is less than the configured number, and the operations further include repeating the DMRS sharing pattern across the configured number of repetitions of the uplink transmission.

In an eighty-sixth aspect alternatively or in addition to one or more of the first through eighty-fifth aspects, the DMRS sharing patterns of the control information include multiple DMRS sharing patterns for a configured number of repetitions and for a DMRS sharing factor of the uplink transmission.

In an eighty-seventh aspect alternatively or in addition to one or more of the first through eighty-sixth aspects, the DMRS sharing pattern is selected from among the multiple DMRS sharing patterns.

In an eighty-eighth aspect alternatively or in addition to one or more of the first through eighty-seventh aspects, the DMRS sharing pattern is selected from among the multiple DMRS sharing patterns dynamically or is indicated by a DMRS sharing configuration parameter indicated by the base station via radio resource control (RRC) configuration signaling, downlink control information (DCI) signaling, or medium access control (MAC) control element (MAC-CE) signaling.

In an eighty-ninth aspect alternatively or in addition to one or more of the first through eighty-eighth aspects, the operations further include receiving an indication of the DMRS sharing factor from the base station.

In a ninetieth aspect alternatively or in addition to one or more of the first through eighty-ninth aspects, the operations further include determining, from among multiple repetition types, a repetition type of the uplink transmission, and the DMRS sharing pattern is determined based on the repetition type.

In a ninety-first aspect alternatively or in addition to one or more of the first through ninetieth aspects, the multiple repetition types include a first repetition type associated with at most one repetition per slot and further include a second repetition type associated with one or more repetitions per slot, and the operations further include reporting, by the UE device to the base station, first capabilities supporting DMRS sharing for the first repetition type and second capabilities supporting DMRS sharing for the second repetition type.

In a ninety-second aspect alternatively or in addition to one or more of the first through ninety-first aspects, the operations further include detecting a puncturing event associated with modification of the uplink transmission from a configured number of repetitions to an actual number of repetitions that is less than the configured number.

In a ninety-third aspect alternatively or in addition to one or more of the first through ninety-second aspects, the operations further include applying the DMRS sharing pattern to the repetitions of the uplink transmission irrespective of the actual number.

In a ninety-fourth aspect alternatively or in addition to one or more of the first through ninety-third aspects, the operations further include: in response to detecting a canceled repetition of the uplink transmission, re-determining the DMRS sharing pattern based on the actual number of repetitions; and applying the re-determined DMRS sharing pattern to remaining repetitions of the uplink transmission.

In a ninety-fifth aspect alternatively or in addition to one or more of the first through ninety-fourth aspects, the one or more parameters of the uplink transmission include a configured number of DMRS symbols per repetition of the uplink transmission.

In a ninety-sixth aspect alternatively or in addition to one or more of the first through ninety-fifth aspects, a number of DMRS sharing patterns available for the uplink transmission as indicated by the control information is based on the configured number of DMRS symbols.

In a ninety-seventh aspect alternatively or in addition to one or more of the first through ninety-sixth aspects, a DMRS sharing factor for the uplink transmission as indicated by the control information is based on the configured number of DMRS symbols.

In a ninety-eighth aspect alternatively or in addition to one or more of the first through ninety-seventh aspects, the one or more parameters of the uplink transmission include an actual number of DMRS symbols per repetition of the uplink transmission.

In a ninety-ninth aspect alternatively or in addition to one or more of the first through ninety-eighth aspects, one or more of a number of DMRS sharing patterns available for the uplink transmission or a DMRS sharing factor for the uplink transmission are based on the actual number of DMRS symbols.

In a one-hundredth aspect alternatively or in addition to one or more of the first through ninety-ninth aspects, a non-transitory computer-readable is in accordance with any combination of the eighty-first through ninety-ninth aspects.

In a one-hundred-and-first aspect alternatively or in addition to one or more of the first through one-hundredth aspects, a non-transitory computer-readable medium stores instructions executable by a processor to perform operations, the operations comprising: sending, by a base station to a user equipment (UE) device, one or more configuration messages including control information, where the control information indicates mapping of uplink transmission parameters to demodulation reference signal (DMRS) sharing patterns; based on one or more parameters of an uplink transmission, determining a DMRS sharing pattern of the uplink transmission from among the DMRS sharing patterns indicated by the control information; and receiving the uplink transmission from the UE device in accordance with the DMRS sharing pattern.

In a one-hundred-and-second aspect alternatively or in addition to one or more of the first through one-hundred-and-first aspects, the uplink transmission includes multiple uplink repetitions of the same uplink channel, and the DMRS sharing pattern indicates an ordering of one or more uplink repetitions of the multiple uplink repetitions that include a DMRS and one or more other uplink repetitions of the multiple uplink repetitions of the uplink channel that do not include the DMRS and that are to be demodulated based on the DMRS.

In a one-hundred-and-third aspect alternatively or in addition to one or more of the first through one-hundredand-second aspects, the operations further include sending, from the base station to the UE device, a message scheduling the uplink transmission and including a configured number of repetitions of the uplink transmission, and the one or more parameters include the configured number of repetitions of the uplink transmission.

In a one-hundred-and-fourth aspect alternatively or in addition to one or more of the first through one-hundred-and-third aspects, the uplink transmission corresponds to a single physical uplink shared channel (PUSCH) transmission with repetitions that span across multiple symbols in one or more slots.

In a one-hundred-and-fifth aspect alternatively or in addition to one or more of the first through one-hundred-and-fourth aspects, the DMRS sharing pattern is based on a number of repetitions that is less than the configured number, and the DMRS sharing pattern repeats across the configured number of repetitions of the uplink transmission.

In a one-hundred-and-sixth aspect alternatively or in addition to one or more of the first through one-hundred-and-fifth aspects, the DMRS sharing patterns of the control information include multiple DMRS sharing patterns for a configured number of repetitions and for a DMRS sharing factor of the uplink transmission.

In a one-hundred-and-seventh aspect alternatively or in addition to one or more of the first through one-hundred-and-sixth aspects, the DMRS sharing pattern is selected from among the multiple DMRS sharing patterns.

In a one-hundred-and-eighth aspect alternatively or in addition to one or more of the first through one-hundred-and-seventh aspects, the DMRS sharing pattern is selected from among the multiple DMRS sharing patterns dynamically or is indicated by a DMRS sharing configuration parameter indicated by the base station via radio resource control (RRC) configuration signaling, downlink control information (DCI) signaling, or medium access control (MAC) control element (MAC-CE) signaling.

In a one-hundred-and-ninth aspect alternatively or in addition to one or more of the first through one-hundred-and-eighth aspects, the operations further include sending an indication of the DMRS sharing factor from the base station to the UE device.

In a one-hundred-and-tenth aspect alternatively or in addition to one or more of the first through one-hundred-and-ninth aspects, the operations further include determining, from among multiple repetition types, a repetition type of the uplink transmission, and the DMRS sharing pattern is determined based on the repetition type.

In a one-hundred-and-eleventh aspect alternatively or in addition to one or more of the first through one-hundred-and-tenth aspects, the multiple repetition types include a first repetition type associated with at most one repetition per slot and further include a second repetition type associated with one or more repetitions per slot, and the operations further include receiving, from the UE device at the base station, reporting of first capabilities supporting DMRS sharing for the first repetition type and second capabilities supporting DMRS sharing for the second repetition type.

In a one-hundred-and-twelfth aspect alternatively or in addition to one or more of the first through one-hundred-and-eleventh aspects, the operations further include detecting a puncturing event associated with modification of the uplink transmission from a configured number of repetitions to an actual number of remaining repetitions that is less than the configured number.

In a one-hundred-and-thirteenth aspect alternatively or in addition to one or more of the first through one-hundred-and-twelfth aspects, the DMRS sharing pattern is applied to the remaining repetitions of the uplink transmission irrespective of the actual number.

In a one-hundred-and-fourteenth aspect alternatively or in addition to one or more of the first through one-hundred-and-thirteenth aspects, the DMRS sharing pattern is re-determined in response to detecting a canceled repetition of the uplink transmission, and the re-determined DMRS sharing pattern is applied to the remaining repetitions.

In a one-hundred-and-fifteenth aspect alternatively or in addition to one or more of the first through one-hundred-and-fourteenth aspects, the one or more parameters of the uplink transmission include a configured number of DMRS symbols per repetition of the uplink transmission.

In a one-hundred-and-sixteenth aspect alternatively or in addition to one or more of the first through one-hundred-and-fifteenth aspects, a number of DMRS sharing patterns available for the uplink transmission as indicated by the control information is based on the configured number of DMRS symbols.

In a one-hundred-and-seventeenth aspect alternatively or in addition to one or more of the first through one-hundred-and-sixteenth aspects, a DMRS sharing factor for the uplink transmission as indicated by the control information is based on the configured number of DMRS symbols.

In a one-hundred-and-eighteenth aspect alternatively or in addition to one or more of the first through one-hundred-and-seventeenth aspects, the one or more parameters of the uplink transmission include an actual number of DMRS symbols per repetition of the uplink transmission.

In a one-hundred-and-nineteenth aspect alternatively or in addition to one or more of the first through one-hundred-and-eighteenth aspects, one or more of a number of DMRS sharing patterns available for the uplink transmission or a DMRS sharing factor for the uplink transmission are based on the actual number of DMRS symbols.

In a one-hundred-and-twentieth aspect alternatively or in addition to one or more of the first through one-hundred-and-nineteenth aspects, a non-transitory computer-readable medium is in accordance with any combination of the one-hundred-and-first through one-hundred-and-nineteenth aspects.

In a one-hundred-and-twenty-first aspect alternatively or in addition to one or more of the first through one-hundred-and-twentieth aspects, an apparatus for wireless communication includes: means for storing instructions; and means for executing the instructions to receive, at a user equipment (UE) device, one or more configuration messages including control information, where the control information indicates mapping of uplink transmission parameters to demodulation reference signal (DMRS) sharing patterns, to determine, based on one or more parameters of an uplink transmission, a DMRS sharing pattern of the uplink transmission from among the DMRS sharing patterns indicated by the control information, and to initiate sending the uplink transmission to a base station in accordance with the DMRS sharing pattern.

In a one-hundred-and-twenty-second aspect alternatively or in addition to one or more of the first through one-hundred-and-twenty-first aspects, the uplink transmission includes multiple uplink repetitions of the same uplink channel, and the DMRS sharing pattern indicates an ordering of one or more uplink repetitions of the multiple uplink repetitions that include a DMRS and one or more other uplink repetitions of the multiple uplink repetitions of the uplink channel that do not include the DMRS and that are to be demodulated based on the DMRS.

In a one-hundred-and-twenty-third aspect alternatively or in addition to one or more of the first through one-hundred-and-twenty-second aspects, the means for executing the instructions is further configured to receive, from the base station, a message scheduling the uplink transmission and including a configured number of repetitions of the uplink transmission, and the one or more parameters include the configured number of repetitions of the uplink transmission.

In a one-hundred-and-twenty-fourth aspect alternatively or in addition to one or more of the first through one-hundred-and-twenty-third aspects, the uplink transmission corresponds to a single physical uplink shared channel (PUSCH) transmission with repetitions that span across multiple symbols in one or more slots.

In a one-hundred-and-twenty-fifth aspect alternatively or in addition to one or more of the first through one-hundred-and-twenty-fourth aspects, the DMRS sharing pattern is based on a number of repetitions that is less than the configured number, the means for executing the instructions is further configured to repeat the DMRS sharing pattern across the configured number of repetitions of the uplink transmission.

In a one-hundred-and-twenty-sixth aspect alternatively or in addition to one or more of the first through one-hundred-and-twenty-fifth aspects, the DMRS sharing patterns of the control information include multiple DMRS sharing patterns for a configured number of repetitions and for a DMRS sharing factor of the uplink transmission.

In a one-hundred-and-twenty-seventh aspect alternatively or in addition to one or more of the first through one-hundred-and-twenty-sixth aspects, the means for executing the instructions is further configured to select the DMRS sharing pattern from among the multiple DMRS sharing patterns.

In a one-hundred-and-twenty-eighth aspect alternatively or in addition to one or more of the first through one-hundred-and-twenty-seventh aspects, the DMRS sharing pattern is selected from among the multiple DMRS sharing patterns dynamically or is indicated by a DMRS sharing configuration parameter indicated by the base station via radio resource control (RRC) configuration signaling, downlink control information (DCI) signaling, or medium access control (MAC) control element (MAC-CE) signaling.

In a one-hundred-and-twenty-ninth aspect alternatively or in addition to one or more of the first through one-hundred-and-twenty-eighth aspects, the means for executing the instructions is further configured to receive an indication of the DMRS sharing factor from the base station.

In a one-hundred-and-thirtieth aspect alternatively or in addition to one or more of the first through one-hundred-and-twenty-ninth aspects, the means for executing the instructions is further configured to determine, from among multiple repetition types, a repetition type of the uplink transmission and to determine the DMRS sharing pattern based on the repetition type.

In a one-hundred-and-thirty-first aspect alternatively or in addition to one or more of the first through one-hundred-and-thirtieth aspects, the multiple repetition types include a first repetition type associated with at most one repetition per slot and further include a second repetition type associated with one or more repetitions per slot, and the means for executing the instructions is further configured to report, by the UE device to the base station, first capabilities supporting DMRS sharing for the first repetition type and second capabilities supporting DMRS sharing for the second repetition type.

In a one-hundred-and-thirty-second aspect alternatively or in addition to one or more of the first through one-hundred-and-thirty-first aspects, the means for executing the instructions is further configured to detect a puncturing event associated with modification of the uplink transmission from a configured number of repetitions to an actual number of repetitions that is less than the configured number.

In a one-hundred-and-thirty-third aspect alternatively or in addition to one or more of the first through one-hundred-and-thirty-second aspects, the means for executing the instructions is further configured to apply the DMRS sharing pattern to the repetitions of the uplink transmission irrespective of the actual number.

In a one-hundred-and-thirty-fourth aspect alternatively or in addition to one or more of the first through one-hundred-and-thirty-third aspects, the means for executing the instructions is further configured to: in response to detecting a canceled repetition of the uplink transmission, re-determine the DMRS sharing pattern based on the actual number of repetitions; and apply the re-determined DMRS sharing pattern to remaining repetitions of the uplink transmission.

In a one-hundred-and-thirty-fifth aspect alternatively or in addition to one or more of the first through one-hundred-and-thirty-fourth aspects, the one or more parameters of the uplink transmission include a configured number of DMRS symbols per repetition of the uplink transmission.

In a one-hundred-and-thirty-sixth aspect alternatively or in addition to one or more of the first through one-hundred-and-thirty-fifth aspects, a number of DMRS sharing patterns available for the uplink transmission as indicated by the control information is based on the configured number of DMRS symbols.

In a one-hundred-and-thirty-seventh aspect alternatively or in addition to one or more of the first through one-hundred-and-thirty-sixth aspects, a DMRS sharing factor for the uplink transmission as indicated by the control information is based on the configured number of DMRS symbols.

In a one-hundred-and-thirty-eighth aspect alternatively or in addition to one or more of the first through one-hundred-and-thirty-seventh aspects, the one or more parameters of the uplink transmission include an actual number of DMRS symbols per repetition of the uplink transmission.

In a one-hundred-and-thirty-ninth aspect alternatively or in addition to one or more of the first through one-hundred-and-thirty-eighth aspects, one or more of a number of DMRS sharing patterns available for the uplink transmission or a DMRS sharing factor for the uplink transmission are based on the actual number of DMRS symbols.

In a one-hundred-and-fortieth aspect alternatively or in addition to one or more of the first through one-hundred-and-thirty-ninth aspects, an apparatus is in accordance with any of the one-hundred-and-twentieth through one-hundred-and-thirty-ninth aspects.

In a one-hundred-and-forty-first aspect alternatively or in addition to one or more of the first through one-hundred-and-fortieth aspects, an apparatus for wireless communication includes: means for storing instructions; and means for executing the instructions to initiate sending, from a base station to a user equipment (UE) device, one or more configuration messages including control information, where the control information indicates mapping of uplink transmission parameters to demodulation reference signal (DMRS) sharing patterns, to determine, based on one or more parameters of an uplink transmission, a DMRS sharing pattern of the uplink transmission from among the DMRS sharing patterns indicated by the control information, and to receive the uplink transmission from the UE device in accordance with the DMRS sharing pattern.

In a one-hundred-and-forty-second aspect alternatively or in addition to one or more of the first through one-hundred-and-forty-first aspects, the uplink transmission includes multiple uplink repetitions of the same uplink channel, and the DMRS sharing pattern indicates an ordering of one or more uplink repetitions of the multiple uplink repetitions that include a DMRS and one or more other uplink repetitions of the multiple uplink repetitions of the uplink channel that do not include the DMRS and that are to be demodulated based on the DMRS.

In a one-hundred-and-forty-third aspect alternatively or in addition to one or more of the first through one-hundred-and-forty-second aspects, the means for executing the instructions is further configured to send, from the base station to the UE device, a message scheduling the uplink transmission and including a configured number of repetitions of the uplink transmission, and the one or more parameters include the configured number of repetitions of the uplink transmission.

In a one-hundred-and-forty-fourth aspect alternatively or in addition to one or more of the first through one-hundred-and-forty-third aspects, the uplink transmission corresponds to a single physical uplink shared channel (PUSCH) transmission with repetitions that span across multiple symbols in one or more slots.

In a one-hundred-and-forty-fifth aspect alternatively or in addition to one or more of the first through one-hundred-and-forty-fourth aspects, the DMRS sharing pattern is based on a number of repetitions that is less than the configured number, and the DMRS sharing pattern repeats across the configured number of repetitions of the uplink transmission.

In a one-hundred-and-forty-sixth aspect alternatively or in addition to one or more of the first through one-hundred-and-forty-fifth aspects, the DMRS sharing patterns of the control information include multiple DMRS sharing patterns for a configured number of repetitions and for a DMRS sharing factor of the uplink transmission.

In a one-hundred-and-forty-seventh aspect alternatively or in addition to one or more of the first through one-hundred-and-forty-sixth aspects, the means for executing the instructions is further configured to select the DMRS sharing pattern from among the multiple DMRS sharing patterns.

In a one-hundred-and-forty-eighth aspect alternatively or in addition to one or more of the first through one-hundred-and-forty-seventh aspects, the DMRS sharing pattern is selected from among the multiple DMRS sharing patterns dynamically or is indicated by a DMRS sharing configuration parameter indicated by the base station via radio resource control (RRC) configuration signaling, downlink control information (DCI) signaling, or medium access control (MAC) control element (MAC-CE) signaling.

In a one-hundred-and-forty-ninth aspect alternatively or in addition to one or more of the first through one-hundred-and-forty-eighth aspects, the means for executing the instructions is further configured to send an indication of the DMRS sharing factor from the base station to the UE device.

In a one-hundred-and-fiftieth aspect alternatively or in addition to one or more of the first through one-hundred-and-forty-ninth aspects, the means for executing the instructions is further configured to determine, from among multiple repetition types, a repetition type of the uplink transmission and to determine the DMRS sharing pattern based on the repetition type.

In a one-hundred-and-fifty-first aspect alternatively or in addition to one or more of the first through one-hundred-and-fiftieth aspects, the multiple repetition types include a first repetition type associated with at most one repetition per slot and further include a second repetition type associated with one or more repetitions per slot, and the means for executing the instructions is further configured to receive, from the UE device at the base station, reporting of first capabilities supporting DMRS sharing for the first repetition type and second capabilities supporting DMRS sharing for the second repetition type.

In a one-hundred-and-fifty-second aspect alternatively or in addition to one or more of the first through one-hundred-and-fifty-first aspects, the means for executing the instructions is further configured to detect a puncturing event associated with modification of the uplink transmission from a configured number of repetitions to an actual number of remaining repetitions that is less than the configured number.

In a one-hundred-and-fifty-third aspect alternatively or in addition to one or more of the first through one-hundred-and-fifty-second aspects, the DMRS sharing pattern is applied to the remaining repetitions of the uplink transmission irrespective of the actual number.

In a one-hundred-and-fifty-fourth aspect alternatively or in addition to one or more of the first through one-hundred-and-fifty-third aspects, the DMRS sharing pattern is re-determined in response to detecting a canceled repetition of the uplink transmission, and the re-determined DMRS sharing pattern is applied to the remaining repetitions.

In a one-hundred-and-fifty-fifth aspect alternatively or in addition to one or more of the first through one-hundred-and-fifty-fourth aspects, the one or more parameters of the uplink transmission include a configured number of DMRS symbols per repetition of the uplink transmission.

In a one-hundred-and-fifty-sixth aspect alternatively or in addition to one or more of the first through one-hundred-and-fifty-fifth aspects, a number of DMRS sharing patterns available for the uplink transmission as indicated by the control information is based on the configured number of DMRS symbols.

In a one-hundred-and-fifty-seventh aspect alternatively or in addition to one or more of the first through one-hundred-and-fifty-sixth aspects, a DMRS sharing factor for the uplink transmission as indicated by the control information is based on the configured number of DMRS symbols.

In a one-hundred-and-fifty-eighth aspect alternatively or in addition to one or more of the first through one-hundred-and-fifty-seventh aspects, the one or more parameters of the uplink transmission include an actual number of DMRS symbols per repetition of the uplink transmission.

In a one-hundred-and-fifty-ninth aspect alternatively or in addition to one or more of the first through one-hundred-and-fifty-eighth aspects, one or more of a number of DMRS sharing patterns available for the uplink transmission or a DMRS sharing factor for the uplink transmission are based on the actual number of DMRS symbols.

In a one-hundred-and-sixtieth aspect alternatively or in addition to one or more of the first through one-hundred-and-fifty-ninth aspects, an apparatus is in accordance with any combination of the one-hundred-and-fortieth through one-hundred-and-fifty-ninth aspects.

In a one-hundred-and-sixty-first aspect alternatively or in addition to one or more of the first through one-hundred-and-sixtieth aspects, a method of wireless communication includes receiving, by a user equipment (UE) device, control information that indicates mapping of uplink transmission parameters to one or more demodulation reference signal (DMRS) sharing patterns. The method further includes sending an uplink transmission to a base station based on a DMRS sharing pattern, where the DMRS sharing pattern is selected from among the one or more DMRS sharing patterns based on one or more parameters of the uplink transmission.

In a one-hundred-and-sixty-second aspect alternatively or in addition to one or more of the first through one-hundred-and-sixty-first aspects, the method includes configuring the uplink transmission to include multiple uplink repetitions of the same uplink channel, and the DMRS sharing pattern to indicate an ordering of one or more uplink repetitions of the multiple uplink repetitions that include a DMRS and one or more other uplink repetitions of the multiple uplink repetitions of the uplink channel that do not include the DMRS and that are to be demodulated based on the DMRS.

In a one-hundred-and-sixty-third aspect alternatively or in addition to one or more of the first through one-hundred-and-sixty-second aspects, the method includes receiving, from the base station, a message scheduling the uplink transmission and including a configured number of repetitions of the uplink transmission, where the one or more parameters include the configured number of repetitions of the uplink transmission.

In a one-hundred-and-sixty-fourth aspect alternatively or in addition to one or more of the first through one-hundred-and-sixty-third aspects, the uplink transmission corresponds to a single physical uplink shared channel (PUSCH) transmission with repetitions that span across multiple symbols in one or more slots.

In a one-hundred-and-sixty-fifth aspect alternatively or in addition to one or more of the first through one-hundred-and-sixty-fourth aspects, the method includes repeating the DMRS sharing pattern across a configured number of repetitions of the uplink transmission.

In a one-hundred-and-sixty-sixth aspect alternatively or in addition to one or more of the first through one-hundred-and-sixty-fifth aspects, determining the DMRS sharing pattern includes selecting the DMRS sharing pattern from among multiple DMRS sharing patterns for a configured number of repetitions and for a DMRS sharing factor of the uplink transmission.

In a one-hundred-and-sixty-seventh aspect alternatively or in addition to one or more of the first through one-hundred-and-sixty-sixth aspects, the method includes selecting the DMRS sharing pattern from among the multiple DMRS sharing patterns.

In a one-hundred-and-sixty-eighth aspect alternatively or in addition to one or more of the first through one-hundred-and-sixty-seventh aspects, the DMRS sharing pattern is selected from among the multiple DMRS sharing patterns dynamically or is indicated by a DMRS sharing configuration parameter indicated by the base station via radio resource control (RRC) configuration signaling, downlink control information (DCI) signaling, or medium access control (MAC) control element (MAC-CE) signaling.

In a one-hundred-and-sixty-ninth aspect alternatively or in addition to one or more of the first through one-hundred-and-sixty-eighth aspects, the method includes receiving an indication of the DMRS sharing factor from the base station.

In a one-hundred-and-seventieth aspect alternatively or in addition to one or more of the first through one-hundred-and-sixty-ninth aspects, a method of wireless communication, includes sending, by a base station to a user equipment (UE) device, control information, where the control information indicates mapping of uplink transmission parameters to one or more demodulation reference signal (DMRS) sharing patterns. The method further includes receiving an uplink transmission from the UE device in accordance with a DMRS sharing pattern, where the DMRS sharing pattern is selected from among the one or more DMRS sharing patterns based on one or more parameters of the uplink transmission.

In a one-hundred-and-seventy-first aspect alternatively or in addition to one or more of the first through one-hundred-and-seventieth aspects, the uplink transmission includes multiple uplink repetitions of the same uplink channel, and the DMRS sharing pattern indicates an ordering of one or more uplink repetitions of the multiple uplink repetitions that include a DMRS and one or more other uplink repetitions of the multiple uplink repetitions of the uplink channel that do not include the DMRS and that are to be demodulated based on the DMRS.

In a one-hundred-and-seventy-second aspect alternatively or in addition to one or more of the first through one-hundred-and-seventy-first aspects, the one or more parameters of the uplink transmission include a configured number of DMRS symbols per repetition of the uplink transmission.

In a one-hundred-and-seventy-third aspect alternatively or in addition to one or more of the first through one-hundred-and-seventy-second aspects, a number of DMRS sharing patterns available for the uplink transmission as indicated by the control information is based on the configured number of DMRS symbols.

In a one-hundred-and-seventy-fourth aspect alternatively or in addition to one or more of the first through one-hundred-and-seventy-third aspects, a DMRS sharing factor for the uplink transmission as indicated by the control information is based on the configured number of DMRS symbols.

In a one-hundred-and-seventy-fifth aspect alternatively or in addition to one or more of the first through one-hundred-and-seventy-fourth aspects, an apparatus for wireless communication includes a memory and one or more processors coupled to the memory. The one or more processors are configured to: receive, at a user equipment (UE) device, control information, where the control information indicates mapping of uplink transmission parameters to one or more demodulation reference signal (DMRS) sharing patterns; and initiate sending an uplink transmission to a base station in accordance with a DMRS sharing pattern, where the DMRS sharing pattern is selected from among the one or more DMRS sharing patterns based on one or more parameters of the uplink transmission.

In a one-hundred-and-seventy-sixth aspect alternatively or in addition to one or more of the first through one-hundred-and-seventy-fifth aspects, the uplink transmission includes multiple uplink repetitions of the same uplink channel, and the DMRS sharing pattern indicates an ordering of one or more uplink repetitions of the multiple uplink repetitions that include a DMRS and one or more other uplink repetitions of the multiple uplink repetitions of the uplink channel that do not include the DMRS and that are to be demodulated based on the DMRS.

In a one-hundred-and-seventy-seventh aspect alternatively or in addition to one or more of the first through one-hundred-and-seventy-sixth aspects, the one or more processors are further configured to determine, from among multiple repetition types, a repetition type of the uplink transmission and to determine the DMRS sharing pattern based on the repetition type.

In a one-hundred-and-seventy-eighth aspect alternatively or in addition to one or more of the first through one-hundred-and-seventy-seventh aspects, the multiple repetition types include a first repetition type associated with at most one repetition per slot and further include a second repetition type associated with one or more repetitions per slot, and the one or more processors are further configured to report, by the UE device to the base station, first capabilities supporting DMRS sharing for the first repetition type and second capabilities supporting DMRS sharing for the second repetition type.

In a one-hundred-and-seventy-ninth aspect alternatively or in addition to one or more of the first through one-hundred-and-seventy-eighth aspects, the one or more processors are further configured to detect a puncturing event associated with modification of the uplink transmission from a configured number of repetitions to an actual number of repetitions that is less than the configured number.

In a one-hundred-and-eightieth aspect alternatively or in addition to one or more of the first through one-hundred-and-seventy-ninth aspects, the one or more processors are further configured to apply the DMRS sharing pattern to the repetitions of the uplink transmission irrespective of the actual number.

In a one-hundred-and-eighty-first aspect alternatively or in addition to one or more of the first through one-hundred-and-eightieth aspects, the one or more processors are further configured to: in response to detecting a canceled repetition of the uplink transmission, re-determine the DMRS sharing pattern based on the actual number of repetitions; and apply the re-determined DMRS sharing pattern to remaining repetitions of the uplink transmission.

In a one-hundred-and-eighty-second aspect alternatively or in addition to one or more of the first through one-hundred-and-eighty-first aspects, an apparatus for wireless communication includes a memory and one or more processors coupled to the memory and configured to: initiate sending, from a base station to a user equipment (UE) device, control information, where the control information indicates mapping of uplink transmission parameters to one or more demodulation reference signal (DMRS) sharing patterns; and receiving an uplink transmission from the UE device in accordance with a DMRS sharing pattern, where the DMRS sharing pattern is selected from among the one or more DMRS sharing patterns based on one or more parameters of the uplink transmission.

In a one-hundred-and-eighty-third aspect alternatively or in addition to one or more of the first through one-hundred-and-eighty-second aspects, the uplink transmission includes multiple uplink repetitions of the same uplink channel, and the DMRS sharing pattern indicates an ordering of one or more uplink repetitions of the multiple uplink repetitions that include a DMRS and one or more other uplink repetitions of the multiple uplink repetitions of the uplink channel that do not include the DMRS and that are to be demodulated based on the DMRS.

In a one-hundred-and-eighty-fourth aspect alternatively or in addition to one or more of the first through one-hundred-and-eighty-third aspects, the one or more processors are further configured to determine, from among multiple repetition types, a repetition type of the uplink transmission and to determine the DMRS sharing pattern based on the repetition type.

In a one-hundred-and-eighty-fifth aspect alternatively or in addition to one or more of the first through one-hundred-and-eighty-fourth aspects, the multiple repetition types include a first repetition type associated with at most one repetition per slot and further include a second repetition type associated with one or more repetitions per slot, and the one or more processors are further configured to receive, from the UE device at the base station, reporting of first capabilities supporting DMRS sharing for the first repetition type and second capabilities supporting DMRS sharing for the second repetition type.

In a one-hundred-and-eighty-sixth aspect alternatively or in addition to one or more of the first through one-hundred-and-eighty-fifth aspects, the one or more processors are further configured to detect a puncturing event associated with modification of the uplink transmission from a configured number of repetitions to an actual number of remaining repetitions that is less than the configured number.

In a one-hundred-and-eighty-seventh aspect alternatively or in addition to one or more of the first through one-hundred-and-eighty-sixth aspects, the DMRS sharing pattern is applied to the remaining repetitions of the uplink transmission irrespective of the actual number.

In a one-hundred-and-eighty-eighth aspect alternatively or in addition to one or more of the first through one-hundred-and-eighty-seventh aspects, the DMRS sharing pattern is re-determined in response to detecting a canceled repetition of the uplink transmission, and the re-determined DMRS sharing pattern is applied to the remaining repetitions.

In a one-hundred-and-eighty-ninth aspect alternatively or in addition to one or more of the first through one-hundred-and-eighty-eighth aspects, the one or more parameters of the uplink transmission include an actual number of DMRS symbols per repetition of the uplink transmission.

In a one-hundred-and-ninetieth aspect alternatively or in addition to one or more of the first through one-hundred-and-eighty-ninth aspects, one or more of a number of DMRS sharing patterns available for the uplink transmission or a DMRS sharing factor for the uplink transmission are based on the actual number of DMRS symbols.

In a one-hundred-and-ninety-first aspect alternatively or in addition to one or more of the first through one-hundred-and-ninetieth aspects, a method includes communicating, by a first device with a second device, control information indicating a mapping of transmission parameters to one or more DMRS sharing patterns. The method further includes communicating, by the first device with the second device, a transmission in accordance with a DMRS sharing pattern, where the DMRS sharing pattern is selected from among the one or more DMRS sharing patterns based on one or more parameters of the transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to FIGS. 1-10 may be implemented via specialized processor circuitry, via executable instructions, and/or combinations thereof.

Those of skill would further appreciate that the various illustrative logical blocks, modules, circuits, and operations (e.g., the logical blocks in FIGS. 7 and 8) described in connection with the disclosure herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication at a user equipment (UE) device, comprising:
    reporting first capabilities supporting demodulation reference signal (DMRS) sharing for a first repetition type and second capabilities supporting DMRS sharing for a second repetition type;
    receiving control information that indicates mapping of uplink transmission parameters to a plurality of DMRS sharing patterns;
    prior to transmitting an uplink transmission, identifying that the uplink transmission is associated with one or more parameters of the uplink transmission parameters, the one or more parameters including one of the first repetition type or the second repetition type;
    identifying a DMRS sharing pattern from among the plurality of DMRS sharing patterns by using the one or more parameters as a lookup to the plurality of DMRS sharing patterns;
    selecting the DMRS sharing pattern for the uplink transmission in accordance with identification of the DMRS sharing pattern; and
    transmitting, to a base station, the uplink transmission in accordance with the DMRS sharing pattern.

2. The method of claim 1, wherein the uplink transmission includes multiple uplink repetitions of an uplink channel, and wherein the DMRS sharing pattern indicates an ordering of one or more uplink repetitions of the multiple uplink repetitions that include a DMRS and one or more other uplink repetitions of the multiple uplink repetitions of the uplink channel that do not include the DMRS and that are to be demodulated in accordance with the DMRS.

3. The method of claim 1, further comprising receiving, from the base station, a message scheduling the uplink transmission and indicating a configured number of repetitions of the uplink transmission, wherein the one or more parameters include the configured number of repetitions of the uplink transmission.

4. The method of claim 1, further comprising repeating the DMRS sharing pattern across a configured number of repetitions of the uplink transmission.

5. The method of claim 1, wherein selecting the DMRS sharing pattern includes selecting the DMRS sharing pattern from among multiple DMRS sharing patterns for a configured number of repetitions and for a DMRS sharing factor of the uplink transmission.

6. The method of claim 5, further comprising selecting the DMRS sharing pattern from among the multiple DMRS sharing patterns.

7. The method of claim 6, wherein the DMRS sharing pattern is selected from among the multiple DMRS sharing patterns dynamically or is indicated by a DMRS sharing configuration parameter indicated by the base station via radio resource control (RRC) configuration signaling, downlink control information (DCI) signaling, or medium access control (MAC) control element (MAC-CE) signaling.

8. The method of claim 5, further comprising receiving an indication of the DMRS sharing factor from the base station.

9. A method of wireless communication by a base station, comprising:
receiving, from a user equipment (UE) device, first capabilities supporting demodulation reference signal (DMRS) sharing for a first repetition type and second capabilities supporting DMRS sharing for a second repetition type;
transmitting, to the UE device, control information that indicates mapping of uplink transmission parameters to a plurality of DMRS sharing patterns to enable the UE device to identify, prior to transmitting an uplink transmission, that the uplink transmission is associated with one or more parameters of the uplink transmission parameters, to identify a DMRS sharing pattern from among the plurality of DMRS sharing patterns by using the one or more parameters as a lookup to the plurality of DMRS sharing patterns, and to select the DMRS sharing pattern for the uplink transmission in accordance with identification of the DMRS sharing pattern; and
receiving the uplink transmission from the UE device in accordance with the DMRS sharing pattern.

10. The method of claim 9, wherein the one or more parameters of the uplink transmission include a configured number of DMRS symbols per repetition of the uplink transmission.

11. The method of claim 10, wherein a number of DMRS sharing patterns available for the uplink transmission as indicated by the control information is associated with the configured number of DMRS symbols.

12. The method of claim 10, wherein a DMRS sharing factor for the uplink transmission as indicated by the control information is associated with the configured number of DMRS symbols.

13. An apparatus for wireless communication at a user equipment (UE) device, comprising:
a memory; and
one or more processors coupled to the memory and configured to:
report first capabilities supporting demodulation reference signal (DMRS) sharing for a first repetition type and second capabilities supporting DMRS sharing for a second repetition type;
receive control information that indicates mapping of uplink transmission parameters to a plurality of DMRS sharing patterns;
prior to transmitting an uplink transmission, identify that the uplink transmission is associated with one or more parameters of the uplink transmission parameters, the one or more parameters including one of the first repetition type or the second repetition type;
identify a DMRS sharing pattern from among the plurality of DMRS sharing patterns by using the one or more parameters as a lookup to the plurality of DMRS sharing patterns;
select the DMRS sharing pattern for the uplink transmission in accordance with identification of the DMRS sharing pattern; and
transmit the uplink transmission to a base station in accordance with the DMRS sharing pattern.

14. The apparatus of claim 13, wherein the uplink transmission includes multiple uplink repetitions of an uplink channel, and wherein the DMRS sharing pattern indicates an ordering of one or more uplink repetitions of the multiple uplink repetitions that include a DMRS and one or more other uplink repetitions of the multiple uplink repetitions of the uplink channel that do not include the DMRS and that are to be demodulated in accordance with the DMRS.

15. The apparatus of claim 13, wherein the one or more processors are further configured to select, from among multiple repetition types including the first repetition type and the second repetition type, a repetition type of the uplink transmission and to select the DMRS sharing pattern in accordance with the repetition type.

16. The apparatus of claim 13, wherein the first repetition type is associated with at most one repetition per slot, and wherein the second repetition type is associated with one or more repetitions per slot.

17. The apparatus of claim 13, wherein the one or more processors are further configured to detect a puncturing event associated with modification of the uplink transmission from a configured number of repetitions to an actual number of repetitions that is less than the configured number.

18. The apparatus of claim 17, wherein the one or more processors are further configured to apply the DMRS sharing pattern to the repetitions of the uplink transmission irrespective of the actual number.

19. The apparatus of claim 17, wherein the one or more processors are further configured to:
in response to detecting a canceled repetition of the uplink transmission, re-determine the DMRS sharing pattern in accordance with the actual number of repetitions; and
apply the re-determined DMRS sharing pattern to remaining repetitions of the uplink transmission.

20. The apparatus of claim 13, wherein the plurality of DMRS sharing patterns include a first set of one or more DMRS sharing patterns associated with the first repetition type and further include a second set of one or more DMRS sharing patterns associated with the second repetition type, the first set different than the second set.

21. The apparatus of claim 13, wherein at least one DMRS sharing pattern of the plurality of DMRS sharing patterns indicates that one or more repetitions associated with the uplink transmission and not including a DMRS are to be demodulated based on a plurality of prior repetitions associated with the uplink transmission that include the DMRS.

22. The apparatus of claim 13, wherein the one or more processors are further configured to receive an indication of a DMRS sharing factor associated with the uplink transmission, the DMRS sharing factor indicating a ratio of a first quantity of uplink repetitions associated with the uplink transmission that include a DMRS to a second quantity of uplink repetitions associated with the uplink transmission that do not include the DMRS.

23. An apparatus for wireless communication at a base station, comprising:
a memory; and
one or more processors coupled to the memory and configured to:
receive, from a user equipment (UE) device, first capabilities supporting demodulation reference signal (DMRS) sharing for a first repetition type and second capabilities supporting DMRS sharing for a second repetition type;
transmit, to the UE device, control information that indicates mapping of uplink transmission parameters to a plurality of DMRS sharing patterns to enable the UE device to identify, prior to transmitting an uplink transmission, that the uplink transmission is associated with one or more parameters of the uplink transmission parameters, to identify a DMRS sharing pattern from among the plurality of DMRS sharing patterns by using the one or more parameters as a lookup to the plurality of DMRS sharing patterns, and to select the DMRS sharing pattern for the uplink transmission in accordance with identification of the DMRS sharing pattern; and
receive the uplink transmission from the UE device in accordance with the DMRS sharing pattern.

24. The apparatus of claim 23, wherein the one or more processors are further configured to determine, from among multiple repetition types including the first repetition type and the second repetition type, a repetition type of the uplink transmission and to determine the DMRS sharing pattern in accordance with the repetition type.

25. The apparatus of claim 23, wherein the first repetition type is associated with at most one repetition per slot, and wherein the second repetition type is associated with one or more repetitions per slot.

26. The apparatus of claim 24, wherein the one or more processors are further configured to detect a puncturing event associated with modification of the uplink transmission from a configured number of repetitions to an actual number of remaining repetitions that is less than the configured number.

27. The apparatus of claim 26, wherein the DMRS sharing pattern is applied to the remaining repetitions of the uplink transmission irrespective of the actual number.

28. The apparatus of claim 26, wherein the DMRS sharing pattern is re-determined in response to detecting a canceled repetition of the uplink transmission, and wherein the re-determined DMRS sharing pattern is applied to the remaining repetitions.

29. The apparatus of claim 23, wherein the one or more parameters of the uplink transmission include an actual number of DMRS symbols per repetition of the uplink transmission.

30. The apparatus of claim 29, wherein one or more of a number of DMRS sharing patterns available for the uplink transmission or a DMRS sharing factor for the uplink transmission are associated with the actual number of DMRS symbols.

* * * * *